United States Patent
Watson

(10) Patent No.: US 9,494,456 B2
(45) Date of Patent: Nov. 15, 2016

(54) DRY PRODUCT DOSAGE DISPENSER WITH MULTIPLE STORAGE COMPARTMENTS AND METHOD FOR PRODUCING SAME

(71) Applicant: The Quaker Oats Company, Chicago, IL (US)

(72) Inventor: Thomas Branton Watson, Chicago, IL (US)

(73) Assignee: Quaker Oats Company, Chicago, IL (US)

(*) Notice: Subject to any disclaimer, the term of this patent is extended or adjusted under 35 U.S.C. 154(b) by 0 days.

(21) Appl. No.: 14/537,129

(22) Filed: Nov. 10, 2014

(65) Prior Publication Data
US 2015/0330824 A1 Nov. 19, 2015

Related U.S. Application Data

(63) Continuation-in-part of application No. 14/278,142, filed on May 15, 2014.

(51) Int. Cl.
*G01F 11/28* (2006.01)
*B65D 25/04* (2006.01)
(Continued)

(52) U.S. Cl.
CPC ............ *G01F 11/282* (2013.01); *B65D 25/04* (2013.01); *B65D 25/52* (2013.01); *G01F 15/001* (2013.01); *Y10T 29/49828* (2015.01)

(58) Field of Classification Search
CPC ..... B65D 25/04; B65D 25/52; G01F 11/282; G01F 15/001; Y10T 29/49828
See application file for complete search history.

(56) References Cited

U.S. PATENT DOCUMENTS 1,155,323 A * 9/1915 McBrown ............ G01F 11/261
                                                    222/456
1,215,018 A * 2/1917 Grossman ............ A47G 19/24
                                                    222/142.4
(Continued)

FOREIGN PATENT DOCUMENTS

GB            413148        7/1934
WO      2011104701 A1      9/2011

OTHER PUBLICATIONS

Dual-Chamber Dispensing Bottles—Part 03 | Best in Packaging, posted Mar. 14, 2014, located at http://bestinpackaging.com/2013/09/27/dual-chamber-dispensing-bottles-part-03/, 8 pages.
(Continued)

*Primary Examiner* — Frederick C Nicolas
*Assistant Examiner* — Bob Zadeh
(74) *Attorney, Agent, or Firm* — James R. Gourley; Celina M. Orr; Carstens & Cahoon, LLP

(57) ABSTRACT

A container with an internal partition within its cavity has multiple compartments for dispensing multiple dry products. The partition comprises a first elongated portion, which forms a product-dispensing chute in the cavity, and an inclined portion slanting away from the chute. The inclined portion has a surrounding perimeter edge that meets with adjacent inner walls of the container except at a bottom perimeter edge, along which dry products pass from the top of the inclined portion. A second elongated portion extends from the top of the inclined portion and across its bottom perimeter edge, dividing the remaining cavity into first and second product storage areas. Additional elongated portions may form additional product storage areas. Flipping of the dispenser from its upright position dispenses products below the inclined portion through the chute. An adjustable bottom can be used to vary doses of the products.

30 Claims, 29 Drawing Sheets

(51) Int. Cl.
   *G01F 15/00*   (2006.01)
   *B65D 25/52*   (2006.01)

(56) References Cited

U.S. PATENT DOCUMENTS

| | | | |
|---|---|---|---|
| 3,323,683 A * | 6/1967 | Cianciolo | A47G 19/24 222/142.6 |
| 3,704,777 A | 12/1972 | Linnebuhr | |
| 3,851,800 A * | 12/1974 | Swain | G01F 11/262 222/129 |
| 4,164,301 A | 8/1979 | Thayer | |
| 4,842,726 A | 6/1989 | Willinger | |
| 5,129,561 A * | 7/1992 | Drobish | G01F 11/262 222/455 |
| 5,391,293 A | 2/1995 | Hansen | |
| 5,706,974 A | 1/1998 | Murdick et al. | |
| 5,850,919 A | 12/1998 | Freed | |
| 5,850,944 A | 12/1998 | Robbins, III et al. | |
| 5,947,336 A | 9/1999 | Thompson | |
| 6,264,068 B1 * | 7/2001 | Ours | A47G 19/02 222/129 |
| 7,922,044 B2 | 4/2011 | Luchinger | |
| 7,946,452 B2 | 5/2011 | Hantman et al. | |
| 8,028,865 B2 | 10/2011 | DeJonge | |
| 8,574,647 B1 | 11/2013 | Gunderson | |
| 2006/0091153 A1 | 5/2006 | Evans et al. | |
| 2007/0221602 A1 | 9/2007 | Dib | |
| 2007/0262097 A1 * | 11/2007 | Antal | G01F 11/261 222/456 |
| 2008/0067195 A1 | 3/2008 | Jennings et al. | |
| 2012/0187066 A1 | 7/2012 | Redl | |
| 2012/0267401 A1 | 10/2012 | Schroedter | |
| 2013/0008919 A1 | 1/2013 | Honan et al. | |
| 2013/0112016 A1 * | 5/2013 | Hansen | G01N 1/10 73/864.51 |
| 2013/0292293 A1 * | 11/2013 | Bernhard | A45C 11/20 206/570 |
| 2015/0330823 A1 * | 11/2015 | Watson | G01F 11/282 222/438 |
| 2015/0330824 A1 * | 11/2015 | Watson | G01F 15/001 222/438 |

OTHER PUBLICATIONS

Suredose—Liquid | Perimeter Brand Packaging, located at http://perimeterbp.com/suredose, 1 page.

Educational Youtube video entitled "This is How McDonalds Makes Their Fries"—posted on Oct. 12, 2012, video length 5:14, located at http://dailyoftheday.com/this-is-how-mcdonalds-makes-their-fries/.

* cited by examiner

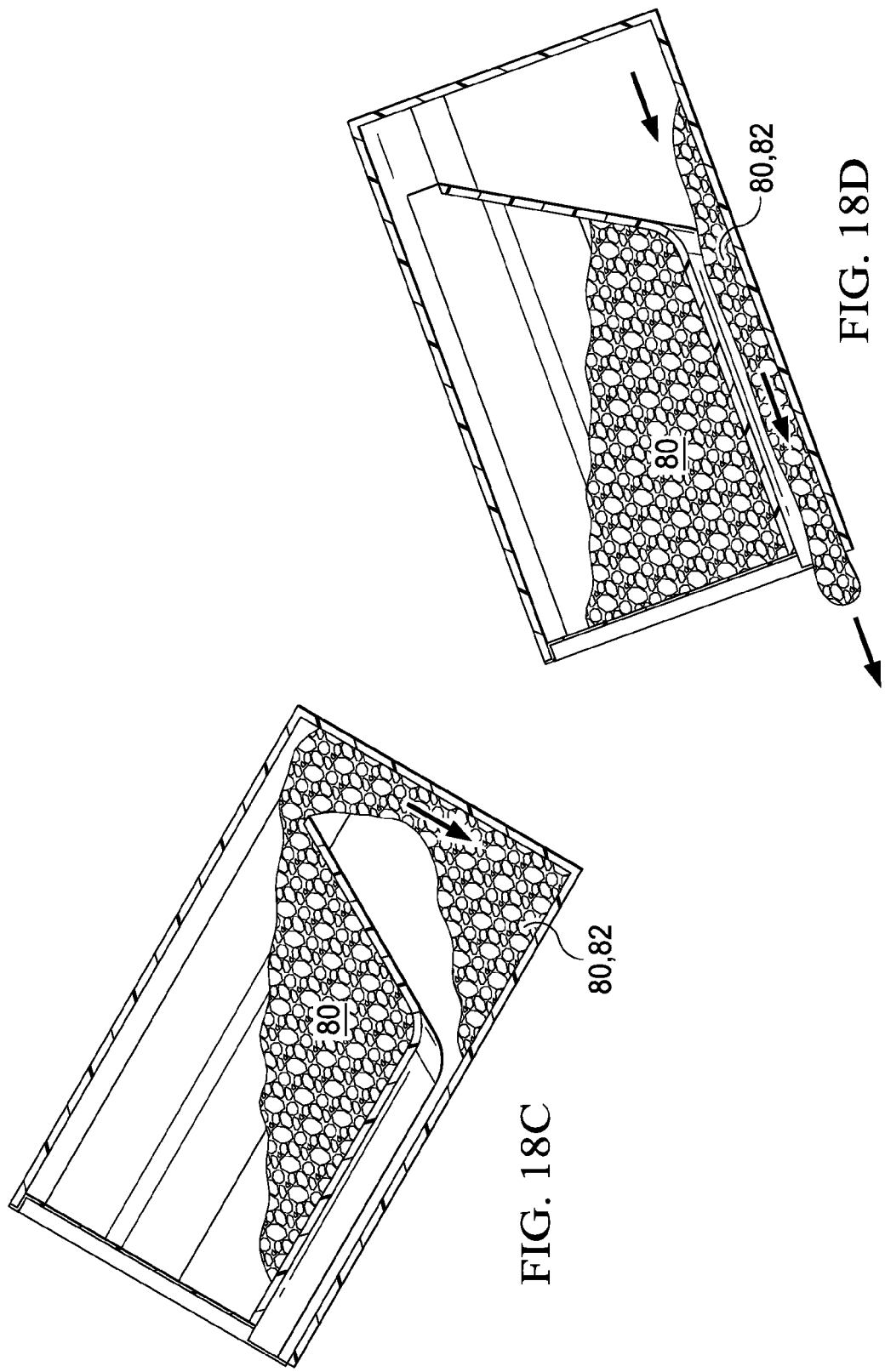

DRY PRODUCT DOSAGE DISPENSER WITH MULTIPLE STORAGE COMPARTMENTS AND METHOD FOR PRODUCING SAME

CROSS-REFERENCE TO RELATED APPLICATIONS

This application is a continuation-in-part of and claims filing priority rights with respect to currently pending U.S. patent application Ser. No. 14/278,142 filed May 15, 2014. The technical disclosure of which is hereby incorporated herein by reference.

BACKGROUND OF THE INVENTION

1. Technical Field

The present invention generally relates to dispensers of dry goods and, more particularly, the dosage dispensing of dry food or solid products, including edible dry substances or solids used in the preparation of foods or drinks.

2. Description of Related Art

Current food packaging products are aimed at providing consumers with ease of use, for example, with opening sealed packaging and/or re-sealing food products therein for future use or consumption. When dispensing of products in predetermined or measured quantities (i.e, a dose) is desirable, often additional valves, springs, latches, conveying tools, turnkeys or other somewhat complex mechanisms are added within or onto the packaging. Such packaging extras can be very costly to produce and/or ship. Traditionally, more cost effective efforts for dosage dispensing include the introduction of measuring cups, caps, or spoons within or onto the packaging. More recently, advances have been made in the area of liquid dispensing packaging in measured amounts such as with liquid detergent. However, in the area of dry goods, including edible solids, there remains a need for a convenient, cost-effective packaging or device that saves both time and effort for a consumer when dispensing specific predetermined desirable amounts. There is also a need for packaging that would also provide for variable adjustable dosing amounts depending on the changing needs or preferences of one or more consumers.

SUMMARY OF THE INVENTION

A body or container with a cavity between top and bottom ends, a cap on the top end, and an internal partition having multiple compartment forms a dry product dosage dispenser for multiple dry products. The partition may be integral to the container or it may be a separate piece for insertion into the cavity. The partition comprises a first elongated portion with vertical sides or edges that meet with adjacent inner walls of the container to form a product-dispensing chute in the cavity. The first elongated portion extends into an inclined portion that slants away from the chute and has a surrounding perimeter edge that meets with adjacent inner walls of the container except at the bottom perimeter edge, at that portion of the inclined portion furthest away from the top end of the container. At least a second elongated portion extends from the top surface of the inclined portion and across its bottom perimeter edge, dividing the remaining cavity into first and second product storage areas. Thus, the partition with its product dispensing chute, inclined portion, and the second elongated portion allow for storage and dispensing of a first and second dry product through the chute. A third elongated portion may also extend from the top surface of the inclined portion, with a portion of it extending beyond the bottom perimeter edge to meet an adjacent inner wall, dividing the second product storage area into two and thereby creating a third product storage area within the cavity in one embodiment. Thus, in one embodiment, it is possible to store and dispense first, second and third dry products within the cavity of the container using the described partition. Flipping of the dispenser from its upright position dispenses dry products through the product-dispensing chute and out an opening in the cap at the top end. Dry products stored in product storage areas of the dispenser will flow through the bottom perimeter edge of the inclined portion, which is not in contact with the adjacent inner walls of the container.

An adjustable bottom, or volume adjustment compartment, can be used to vary doses of the products in some embodiments. Dry product may be sealed within the dispenser when using the adjustable volume compartment. The bottom of the product storage areas rest against the adjustable volume compartment and the cap on the top end covers and seals the products in the product storage areas until dispensing is desired. To dispense of a specific amount of dry products, the adjustable bottom is vertically adjusted down to increase the volume of the cavity, or lengthen the dispenser, thereby causing the dry products to flow out of their respective storage areas and into a common area below the inclined portion. The more the adjustable bottom is adjusted or moved away from the body, the greater the volume and therefore the greater the amount of dry products dispensed. The common area below the inclined portion and the chute, formed in part by the first elongated portion, make up a product-dispensing area of the dispenser, in and through which dry products are passed before exiting the dispenser from their storage areas.

The internal partition may be integral to the container or removable for use as an insert or insertable partition, as stated above. As an insert, the partition is able to transform a container into a dry product dosage dispenser through leveraging of the walls to meet with the partition and form divisions or compartments for different product storage areas and the product dispensing area.

Consequently, in one aspect the present disclosure relates to a dispenser for multiple dry products. In another aspect, the present disclosure relates to a partition for dividing a cavity of a container into multiple compartments for storage and dispensing of multiple dry products. In yet another aspect, the present disclosure relates to a method of forming a dispenser for multiple dry products. Additional aspects and advantages of the present invention will be presented in the following description, some will become obvious through the following description, or will be understood from the practice of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 18C depicts a cross sectional view of the embodiment of 18B illustrating the dry products flow along the product dispensing area during dispensing.

FIG. 18D depicts the dry product flow through the exit port of the dispenser.

DETAILED DESCRIPTION OF THE INVENTION

Figure 1:
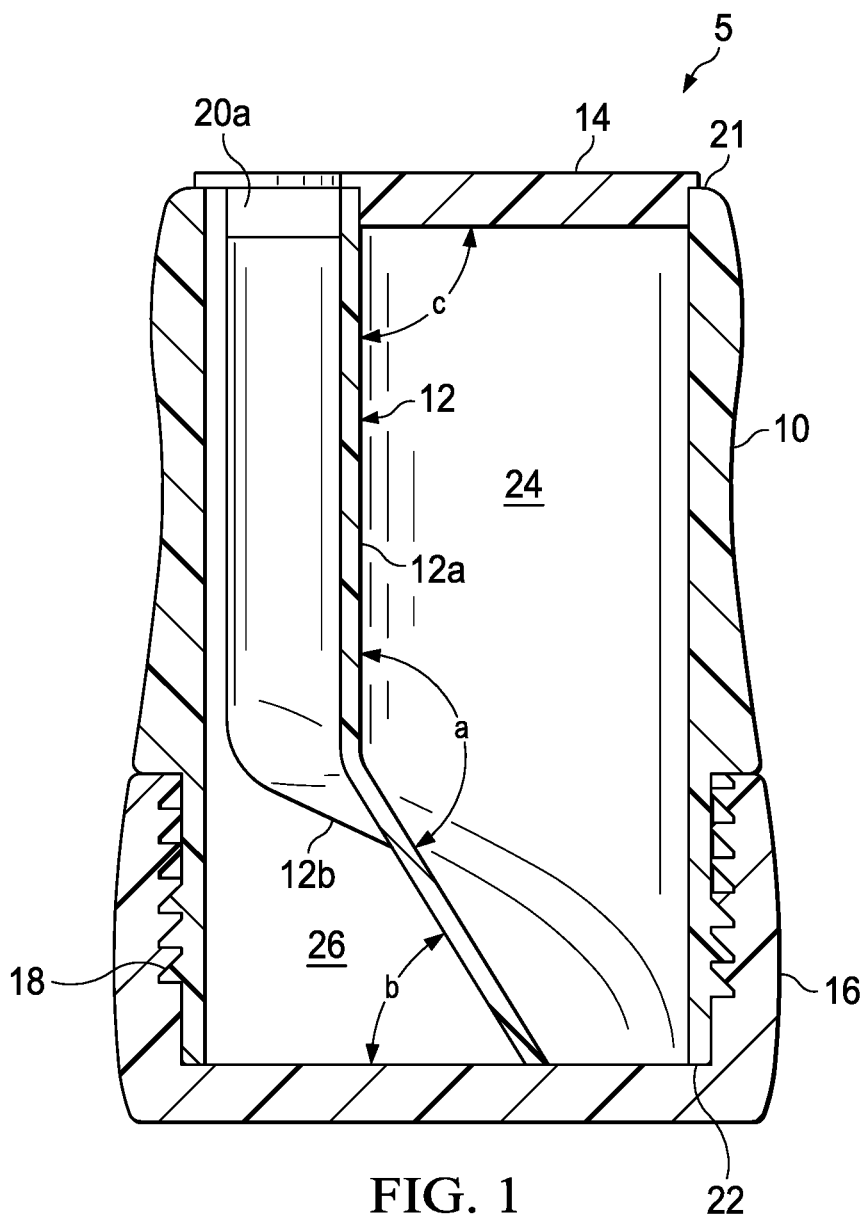
FIG. 1 is a cross-sectional view of one embodiment of the dispenser in a closed position without dry product therein.

All embodiments of a dry product dosage dispenser as described herein may be used for dispensing doses of a dry product. As used herein, a "dry product" for use with the dispenser is meant to refer to any solid or non-liquid product capable of freely flowing under the influence of gravity such as those having granular, flake, grain, or powder qualities. In one embodiment, the dry product is meant to more specifically encompass a dry food product, dry food, solid food product, or an edible dry product, whether ready for direct consumption or for use in the preparation of foods for consumption, including without limitation grains, granular materials, flakes, and fine particles such as powders. By way of example, the dry product dispenser described herein can be used for any number of dry product including without limitation coffee grounds or beans, sugar (granulated or powdered), seeds, spices, oats, cereals, nuts, grains, baking powder, dried fruits, and seasonings as well as dry laundry detergent, sand, and salts useful for purposes other than food such as de-icing salt. In one embodiment, the dry product comprises an edible dry product selected from one or more of oats, cereals, seasonings, peanuts, almonds, cashews, pecans, pistachios, dried fruits, kernels, and sunflower seeds.

All components of the dry product dispensers described herein may be made of or comprise one or more of plastic, metal, cardboard, or any other material suitable for storing edible products and/or maintaining moisture of shelf-stable foods. By way of example, one or more components of the dry product dispenser may include without limitation any plastic made of formation techniques such as injection molding or thermoforming (including ABS plastic as ABS-containing plastics or other molded plastic), any cardboard containing materials such as spiral wound cardboard, or any other cardboard whether or not coated with a suitable plastic material to resist moisture and provide some rigidity. For handheld dispensing purposes, it is desirable to keep the dispenser lightweight and portable for easy to use access.

One embodiment of the dry product dispensing apparatus 5 will now be described with reference to the figures. In accordance with one aspect of the present disclosure, the dry product dosage dispenser 5 comprises a body 10 having a first end 21 and a second end 22 and a cavity there between, wherein the second end 22 comprises one of a closed end integral to the body or an adjustable volume compartment 16 for adjusting a volume of the cavity; a cap 14 on at least a portion of the first end 21 of the body; an internal partition 12 extending between the first end 21 and the second end 22 of the body, thereby dividing the cavity of the body into a first product storage area 24 and a second product dispensing area 26, the second product dispensing area 26 for dispensing of the dry product 25 from the first product storage area 24.

In one embodiment, the body 10 comprises a cylindrical shape. However, it should be noted that the body may comprise any number of shapes, including without limitation box, square, cube, triangular, ovular, or irregular shapes having one or more different shapes, so long as the other limitations are met to provide for flow of the dry product from a storage area and into the dispensing area as described herein.

Depending on the orientation of the dispenser, the first end 21 and second end 22 comprise top and bottom portions, respectively, to the body 10. In the upright position, the first end 21 is the top of the dispenser and the second end 22 is its bottom end. The first and second ends 21, 22 comprise a cavity there between, which is substantially hollow, having only the divider or internal partition 12 that extends from the first end 21 of the body to the second end 22 of the body and forms two sub-cavities 24, 26. One of the sub-cavities 24 being for dry product storage or receiving of dry product, and the other sub-cavity 26 being for dry product dispensing.

In an upright dispenser position, the cap 14 is above both the product storage area and the product dispensing area. Each of the first product storage area and the second product dispensing area extend alongside one another on either side of internal partition 12 within and along the length of the body 10, in between the first 21 and second 22 ends of the body. FIGS. 1, 4B, 5A-C, and 6A-C depict the cross-section side view of the dry product dispenser with the cross-section through the internal partition 12, which will be further described below.

Figure 9:
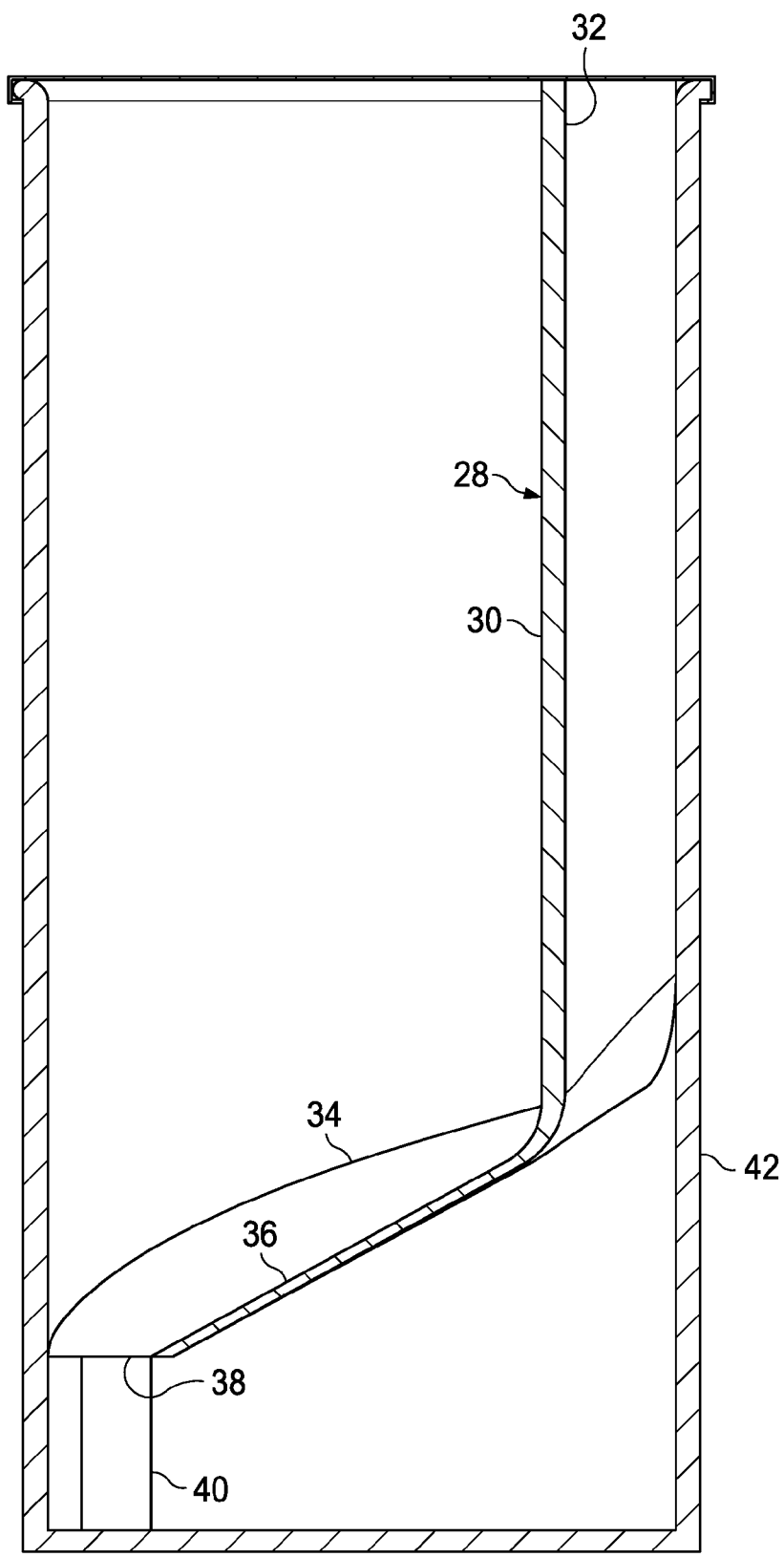
FIG. 9 depicts a cross-sectional view of an insert within a canister without dry product therein.

The second end 22 of the body 10 comprises one of a closed end integral to the body or an adjustable volume compartment for adjusting a volume of the cavity. The embodiment comprising a closed end integral to the body, shown for example in FIG. 9, provides for dispensing of a single dosage amount in a consistent manner. The embodiment comprising the adjustable volume compartment, shown for example in FIGS. 1-6, provides for dispensing of varied dosage amounts in a consistent manner. That is, both embodiments provide for dispensed amounts or doses of predetermined amounts of dry product from the dispenser; however, the adjustable volume compartment allows a consumer to dispense different measured amounts of dry product, thereby varying the doses. In addition, the adjustable volume compartment 12 allows for sealing of dry product within the product storage area when a cap covers the end of the product storage area opposite to the adjustable volume compartment.

As shown in FIGS. 5A-C and 9-10, whenever a common area of space 15 is present below the internal partition 12 and directly beneath the two-subcavities, the two sub-cavities are in direct contact with one another and allow for dispensing of the dry product from the product storage area. Thus, the first product storage area and the second product dispensing area are in direct contact with one another by way of a common area within the body, the common area directly beneath the first product storage area and the second product dispensing area. Passage through to the common area is through an opening formed in or by the internal partition, as will be described further below. The internal partition, however, prevents contact between the first product storage area and the second product dispensing area when the adjustable volume compartment meets an end of the internal partition.

Figure 2:
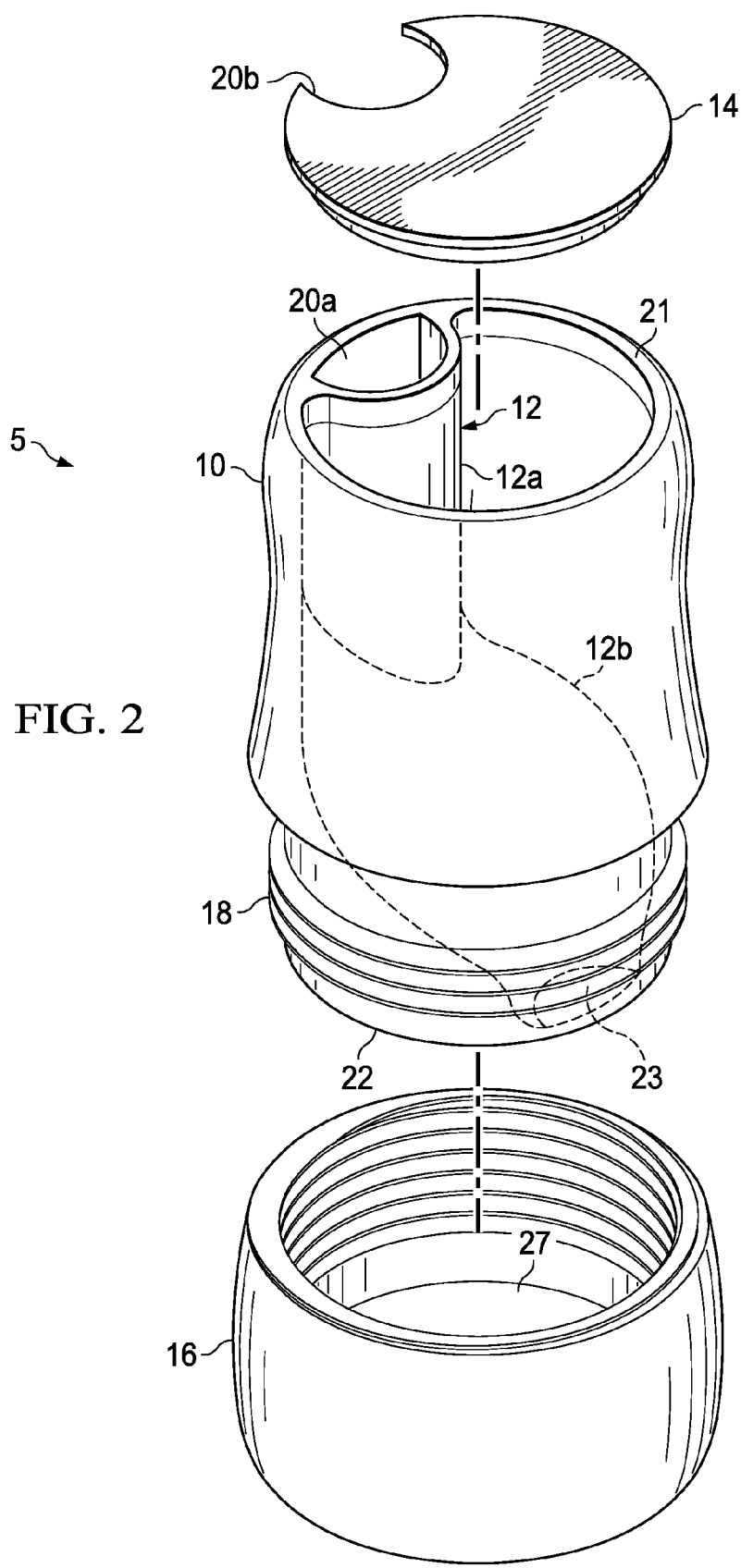
FIG. 2 is an exploded view of one embodiment of the dispenser.

In general, the cap 14 covers at least a portion of the first end of the body 10. In one embodiment, as best depicted in FIGS. 1 and 2, the cap 14 substantially covers the first end of the body 10 and comprises an exit port 20a through which product may exit from the dispenser, as further described below. As discussed above, the cap 14 may serve in part to seal a sub-cavity 24 closed on one end of the body 10. Thus, the cap may cover only the sub-cavity 24 in one embodiment. Alternatively, the cap may cover the entire first end of the body. However, in embodiments where the cap completely covers the periphery of the first end, it must be removable or it must comprise a removable portion to allow for dispensing of the dry product. The product storage area 24 must remain capped or closed at the first end during dispensing, whether through use of a separate seal, lid or cap, whether permanently or temporarily in place.

Figure 3A:
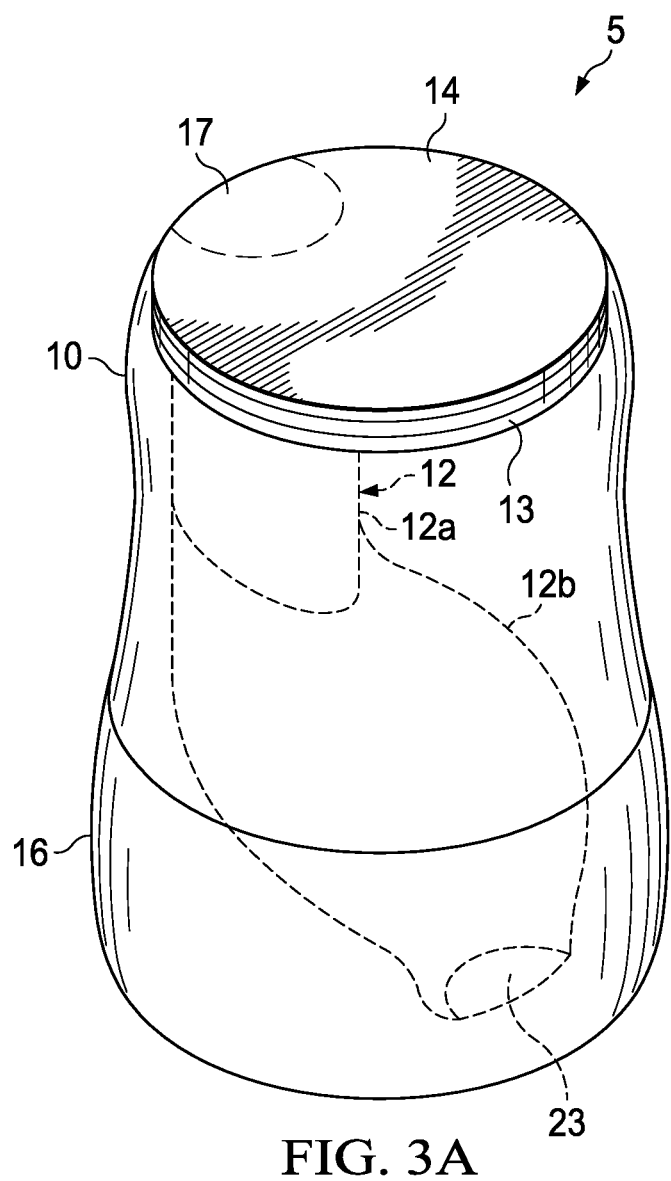
FIG. 3A depicts one embodiment of the cap of the dispenser.
Figure 3B:
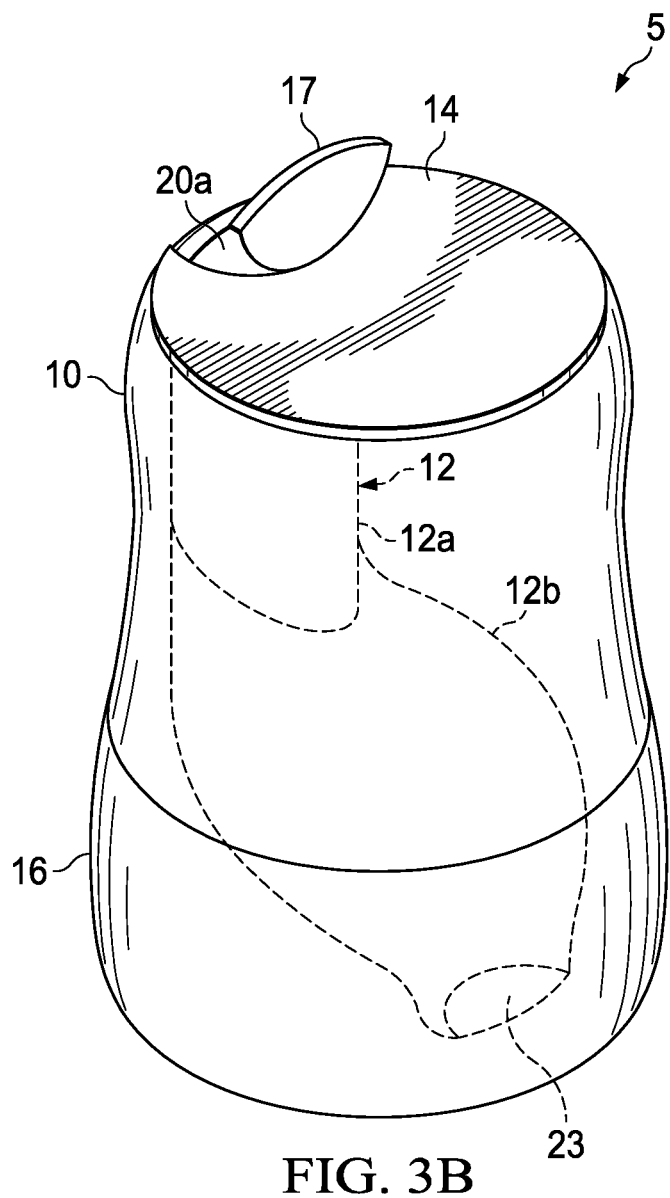
FIG. 3B depicts another embodiment of the cap of the dispenser.
Figure 4A:
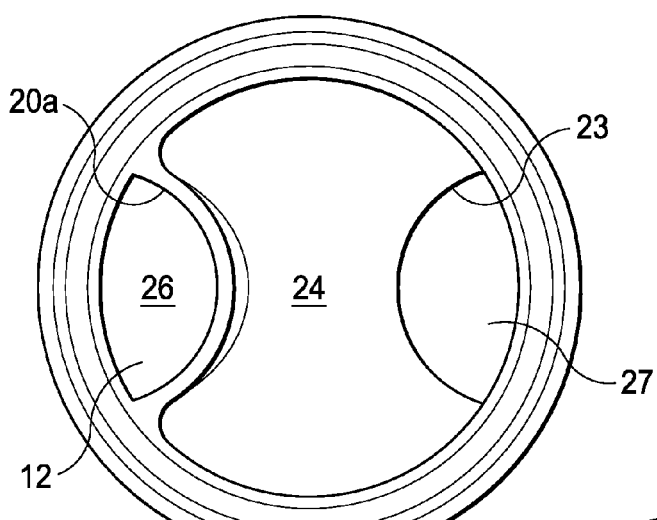
FIG. 4A depicts a top view of one embodiment of the dispenser without the cap.
Figure 4B:
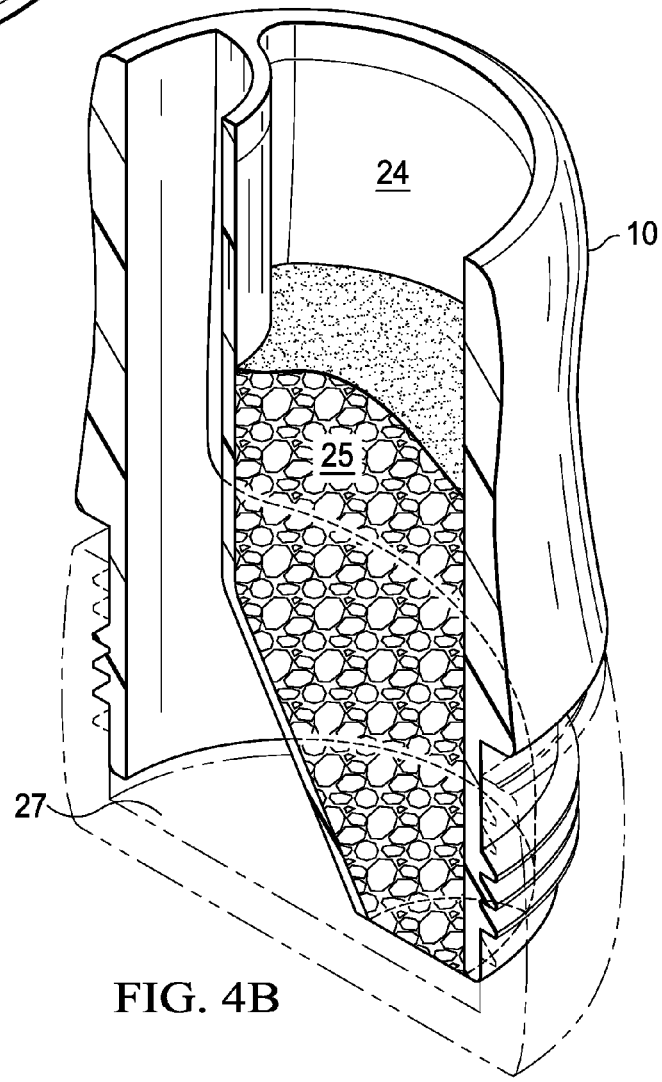
FIG. 4B is a perspective cross-sectional view of one embodiment of the dispenser without the cap and having dry product therein.

As shown in FIG. 3a, in one embodiment, the cap 14 may comprise a tamper-proof type seal 13, which may cover the entire cap and a portion of the rim at the first end 21 of the body 10. In one embodiment, the cap may comprise a detachable portion 17 that may be either partially or fully removed to expose an exit port 20b. In one embodiment, the detachable portion 17 may comprise score lines, for example, which may be removed by a consumer through the application of pressure. In one embodiment, the detachable portion 17 may comprise a flip top cap, for instance, (as shown in FIG. 3B). Any other means known in the art may also be incorporated into the cap 14 for exposure of an exit port 20b in some embodiments. As shown in FIG. 2, the exit port 20b of the cap 14b may be present without any seal or detachable portion in one embodiment.

In one embodiment, the cap 14 is removable to ensure easy access to and selectively expose an area 24 within the body 10 for product receiving and storage. In another embodiment, the cap 14 is permanently fixed on one end to create a one-time only use disposable dispenser if desired. Embodiments having a permanently fixed cap integral to the entire first end of the body necessitate an exit port, or access to or formation of an exit port in the cap for dispensing of the dry product.

In one embodiment, the cap comprises a circumferential rim or flange that engages and seals against the first end of the body 10. As perhaps best shown in FIG. 2, the bottom of the cap 14 may comprise a lower wall or rim around its bottom side circumference that is slightly smaller than the circumference at the lip of the top of the body 10 with which it engages. The rim of the cap 14 securely fits around the top of the body 10 and ensures a snug fit that is maintained during dispensing processes (i.e., when the dispenser is turned upside down or rotated up to 180 degrees or more). While the cap 14 is shown in the FIGS. 1-2 to comprise a rim that extends downward from the cap, any secure or tight connection between the cap 14 and the body 10 is acceptable so long as the cap remains in place during dispensing. For example, the cap may also comprise a perimeter with an upper and lower edge adapted to fit over and around the lip of first end of the body or for engaging the first end of the body. In one embodiment, the cap 14 is substantially flat. In one embodiment, the cap 14 comprises flat external side and a flat internal side. Any cap shape that forms a seal with at least some portion of one end of the body 10 is possible.

As best depicted in FIG. 2, in one embodiment, the cap 14 comprises an exit port 20b. In one embodiment, the cap comprises an exit port 20b along one of its edges. In other embodiments, the exit port may be formed in any place in the cap in communication with the product dispensing area, or sub-cavity of the dispenser. In one embodiment, the exit port 20b comprises a rounded shape, which may include any shape semi-circular to circular, including without limitation a circle, half-circle, or gibbous shape. As used herein, the term gibbous refers to any rounded shape greater than a half circle. In practice, the exit port 20b may comprise any shape so long as it at least a portion of it aligns with an opening in the body 10 and does not interfere with product flow from the dispenser, as further described below. In some embodiments, the exit port 20b may comprise a tamper proof seal.

The size of the exit port 20b may vary in accordance with the particular dry product to be dispensed. In embodiments comprising a rounded shape, the exit port 20b may comprise an area of about 0.75 to about 1.75 inches. In some embodiments, by way of example, the exit port may comprise a diameter of between about 1.00 to about 1.5 inches. In one embodiment, the exit port 20b of the cap 14 aligns with a product-dispensing opening or discharge port 20a, which is formed by the internal partition, further described below.

In some embodiments, the internal partition 12 is rigid. The internal partition 12 may also be somewhat flexible in some embodiments, so long as the free movement of the dry product in the sub-cavities remains unfettered. In one embodiment, the internal partition 12 is permanently formed or fixed within the body 10. Thus, in one embodiment, the internal partition 12 may be integrated with the body 10 into a single structure. In one embodiment, the internal partition 12 may be removable. In other embodiments, the internal partition may form a separate removable piece or insert, which may be removed, for example, for cleaning and/or temporarily attached within the body 10 when dispensing is desirable. Such temporary attachment may be performed by any means known in the art. In an embodiment comprising a closed end integral to the body, the internal partition comprises a leg portion, said leg portion contacting the closed end integral to the body. One embodiment of an insert (also referred to herein as an insertable partition) will be further described below with reference to FIGS. 7-10.

As perhaps best shown in FIG. 2, in one embodiment, a portion of the internal partition 12 comprises an elongated portion or shape 12a and, together with an interior wall of the body 10, this shape forms a substantially vertical passageway that extends from the first end 21 of the body 10 before curving out and sloping downward towards the second end 22 of the body 10 and into an inclined portion 12b, described below. In one embodiment, the internal partition 12, together with an internal wall of the body, form a substantially vertical passageway that extends from the first end 21. In one embodiment, the substantially vertical passageway is tubular or tube-like. The length of the elongated portion or substantially vertical passageway may vary. In one embodiment, the elongated portion 12a extends at least halfway down the length of the body 10 before sloping down. In one embodiment, the elongated portion 12a extends about three-fourths of the way down the length of the body 10 before sloping down. In one embodiment, the elongated shape 12a is tubular or semi-tubular, thereby creating a substantially vertical tubular passageway extending down from the first end, which is formed by the elongated shape of the internal partition 12 and an interior wall of the body 10. The tubular passageway comprises a discharge port 20a on the first end 20 of the body 10. As used herein, substantially vertical means the elongated portion or passageway formed in part by the elongated portion may be vertical or may deviate somewhat from perfectly vertical so long as it allows product to flow freely on or about a surface of the elongated portion to the discharge port 20a when the dispenser is flipped.

In one embodiment, the passageway 12a formed in part by the internal partition 12 forms a discharge port 20a, which communicates with the exit port 20b of the cap 14. Thus, the exit port 20b communicates with a discharge port 20a of the second product dispensing area 26, the discharge port 20a formed between the internal partition 12 and an internal wall of the body 10. In one embodiment, the exit port 20b substantially aligns with a discharge port 20a of the second product dispensing area at the first end of the body 10. The discharge port 20a may comprise any shape so long as it permits dry product to exit from the product dispensing area, as further described below. In one embodiment, the discharge port 20a comprises a rounded shape, which includes any shape from semi-circular to circular, including without limitation a circle, half-circle, or gibbous shape. In one embodiment, the discharge port 20a of the second product dispensing area is formed by and between the internal partition 12 and an internal wall of the body 10. The size and/or area of the discharge port 20a and/or the exit port 20b will vary depending on the dry product to be dispensed.

With reference again to FIG. 2, following the formation of the substantially vertical passageway, the internal partition 12 then comprises an inclined portion 12b that spans the internal perimeter of the body 10, contacting interior walls of the body while moving down towards a narrow opening 23 at the bottom end 22 of the body 10. More specifically, the internal partition 12 comprises an inclined portion 12b with a perimeter that spans at least a substantial portion of an internal perimeter of the body 10, said inclined portion 12b forming an angled top surface and an angled bottom surface, thereby providing passage or ramp for the dry product.

As used herein, a substantial portion of an internal perimeter (i.e., perimeter or circumference of the inner walls) of the body means that the periphery of the inclined portion may span or contact almost an entire perimeter of the interior side of the body except that a gap or opening is formed between the inclined portion and the interior wall of the body or container. Thus, a small piece of the periphery of the inclined portion recedes from the periphery and back towards the center of the inclined portion, forming a depression-type portion in the periphery, leaving a small open space formed in between the inclined portion of the partition and a wall of the body or container. The open space may be a C-shaped, U-shaped, V-shaped, semi-circular, or semi-ovular portion, for example, within the outer edge or periphery of the inclined portion. Alternatively, the inclined portion may also span an entire perimeter if, for example, an opening is made elsewhere within the inclined portion independent of the wall.

With reference to FIG. 1, in one embodiment, the inclined portion 12b comprises an obtuse angle a as it slopes downward relative to the passageway 12a and forms an inclined angle on both its top and bottom surfaces. The angle a may vary depending upon the size, length, perimeter or circumference of the body 10 so long as the inclined portion 12b provides an inclined surface on which dry product is forced downwards. In one embodiment, the angle a may range from about 100 to about 145 degrees. In one embodiment, the angle a may range from about 115 to about 135 degrees. In one embodiment, the angle a comprises between about 125 to about 130 degrees. In one embodiment, the inclined portion 12b further comprises a second steeper slope in its center (similar to that discussed below and shown in FIG.

7A) to further force the dry product down. Either surface of the inclined portion 12b should provide a ramped or funneled surface for the undisturbed flow of the dry product within the first product storage area into a common area under the partition at the second end of the body which will be further described below. In one embodiment, one end of the internal partition 12 forms an acute angle b with the interior of the adjustable volume compartment. In one embodiment, the angle b may range from between about 20 to about 80 degrees. In one embodiment, the angle b may range from about 30 to about 45 degrees. In one embodiment, the angle b may comprise about 35 degrees. In one embodiment, the angle b may comprise about 60 degrees. With reference to a horizontal plane passing through rim of the body or container, in one embodiment, the internal partition 12 comprises an angle c ranging from about 45 to about 95 degrees. In one embodiment, the angle c may range from about 80 to about 95 degrees. In one embodiment, the angle c comprises about 90 degrees.

The internal partition 12 comprises a curvilinear shape. As depicted in the figures, the internal partition 12 is asymmetrical about at least one plane passing through the dispenser. As best depicted in FIG. 2, in one embodiment, the internal partition 12 is asymmetrical along about a plane perpendicular to the cross-section shown in FIGS. 1, 3B and 4-5 (i.e., a vertical plane that passes substantially through the product storage area (and not the passageway of the elongated portion 12a) and divides the dispenser into right and left halves). As shown in FIGS. 1, 4B and 5-6, the internal partition 12 is symmetrical about only one plane in one embodiment. More particularly, the internal partition 12 is symmetrical about a vertical plane that passes through the middle of the passageway of the elongated portion 12a, dividing the dispenser into equal halves.

As depicted in the FIGS. 1-6, the internal partition 12 forms a diverging funnel-type structure in each of the first product storage area 24 and the second product dispensing area 26. The diverging funnel-type structure forming in one of the first product storage area and the second product dispensing area, for example, a wide upper opening on one end of the body opposite a narrow lower opening on the other end. That is, in the upright position of the dispenser 5, the internal partition 12 forms in the first product storage area 24 a wide upper opening at the first end 21 and a narrow lower opening 23 at the second end 22. In one embodiment, the narrow lower opening 23 of the first product storage area 24 contacts the inner side 27 of the adjustable volume compartment 16 when the apparatus is in a closed position and the cap 14 covers the wide upper opening, thereby sealing the dry product 25 within the first product storage area 24. When the dispenser 5 is turned upside down, the internal partition also forms in the second product dispensing area 26 a wide upper opening at the second end 22 and a narrow lower opening at the first end 21. Thus, there is a funnel-like effect in each of the first product storage area 24 and the second product dispensing area 26, which is utilized for dispensing the dry product. The wide opening of one sub-cavity is on the same end of the body 10 as the narrow opening of the other sub-cavity, and vice versa. Thus, the internal partition 12 forms two sub-cavities and four openings in the body 10, two openings on each end 21, 22. In one embodiment, both openings on either end of the body are formed in part by an interior wall of the body 10. It should further be noted that the internal partition is a solid structure. While openings are formed in part by the internal partition at either end of the container, the internal partition comprises no holes along the internal length of the body.

At the second end of the body 10 is an adjustable volume compartment 16, which is used to adjust the volume of the cavity between the first 21 and second 22 ends. As best shown in FIG. 1, in the closed position of the dispenser, an end of the internal partition 12 at the second end 22 of the body 10 meets the interior side of the adjustable volume compartment 16. The contact between the internal partition 12 and the adjustable volume compartment 16 thereby prevents contact between the two sub-cavities 24, 26 until dispensing is desired, as described above.

In one embodiment, the adjustable volume compartment 16 comprises a circumferential rim extending about a periphery of the adjustable volume compartment 16, said rim for mating with the second end of the body 10. In one embodiment, the circumferential rim comprises threading for mating with corresponding threading near the second end of the body. Thus, in one embodiment, the adjustable volume compartment 16 is attached to the bottom end of the body 10 by way of threads 18 such that the adjustable volume compartment 16 is adjusted, for example, by way of rotation through the screw interface. In one embodiment, the body 10 comprises an exterior male threaded interface, while the adjustable volume compartment 16 comprises an internal female threaded interface. While the connection between the body 10 and the adjustable volume compartment 16 is shown as threads, other popular means of attachment could also be used by those skilled in the art so long as the volume between the internal partition and the adjustable volume compartment is lengthened or enlarged, including without limitation a sliding mechanism. In principle, both the cap 14 and the adjustable volume compartment 16 on opposing ends of the body 10 can be releasably connected to the body by any state-of-the-art connection.

Figure 5A:
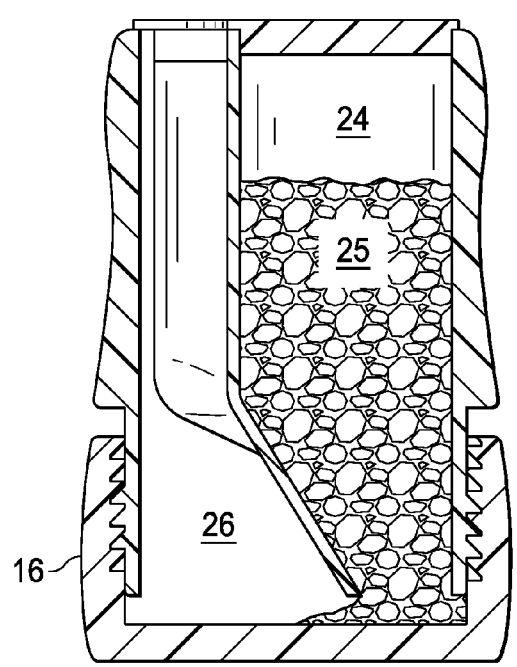
FIG. 5A is a cross-sectional view of one embodiment of the dispenser having dry product therein when adjusted to receive a measured quantity of dry food from the product storage area.
Figure 5B:
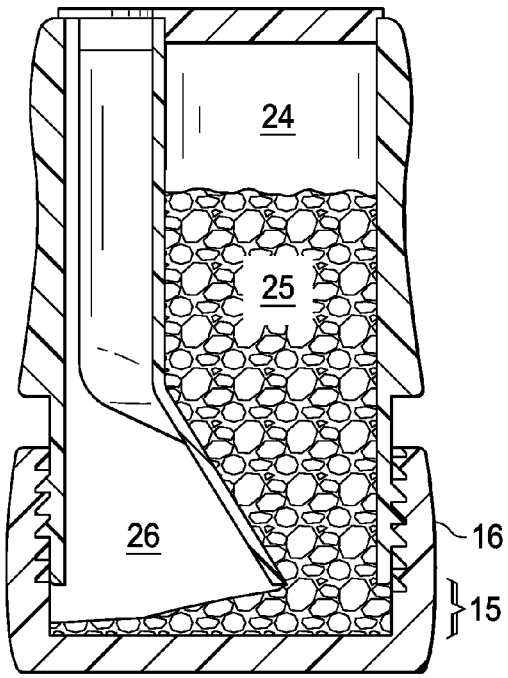
FIG. 5B is a cross-sectional view of one embodiment of the dispenser when further adjusted to receive a measured quantity of dry food from the product storage area.
Figure 5C:
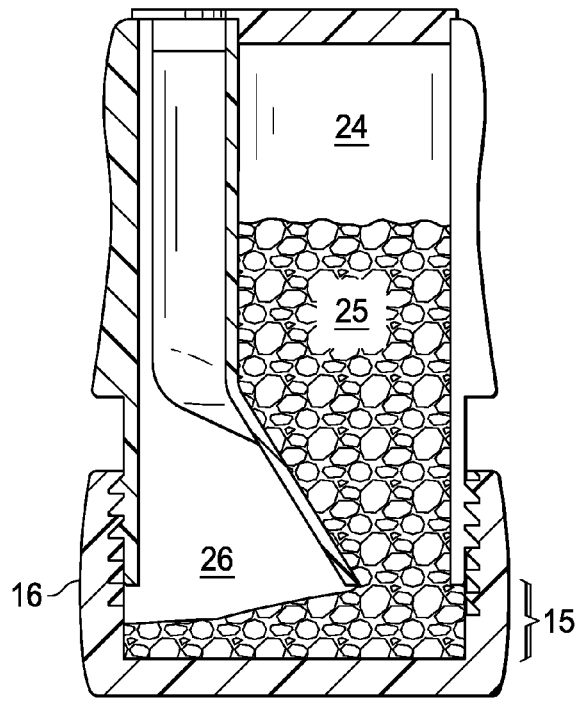
FIG. 5C is a cross-sectional view of one embodiment of the dispenser when further adjusted to receive a measured quantity of dry food from the product storage area.

The adjustable volume compartment 16 is vertically adjustable to create a variable common area of space 15 within the cavity of the body directly under the first product storage area 24 and the second product dispensing area 26, said variable common area of space creating an open communication between the first product storage area 24 and the second product dispensing area 26 for dispensing of the dry product. The variable common area of space 15 is in fact an enlargeable volume of space within the cavity. Referring now more specifically to FIGS. 5A-C, as the adjustable volume compartment 16, is vertically displaced or moved away from the body 10 from a closed position, as shown in FIG. 5A, a common area of space 15 is formed. The enlarged volume of space creates open communication between the first product storage area 24 and the second product dispensing area 26. Prior to desired dispensing, the volume adjustment compartment 16 is moved away from the body 10 such that the product 25 will begin to flow down from the narrow opening of the product receiving area 24 and into the volume adjustment compartment 16 as shown in FIG. 5A. FIG. 5B depicts the volume adjustment compartment 16 having been further displaced away from the body to form a larger common area 15 under the partition 12 into which more product 25 has moved. FIG. 5C shows additional downward vertical displacement of the volume adjustment compartment 16 and a corresponding additional amount of product 25, which has been forced down into a further enlarged common area 15 and onto the interior side of the volume adjustment compartment 16. Thus, essentially to dispense the dry product 25 in embodiments comprising an adjustable volume compartment, the volume adjustment compartment 16 is adjusted to increase the volume of the body 10.

Figure 6C:
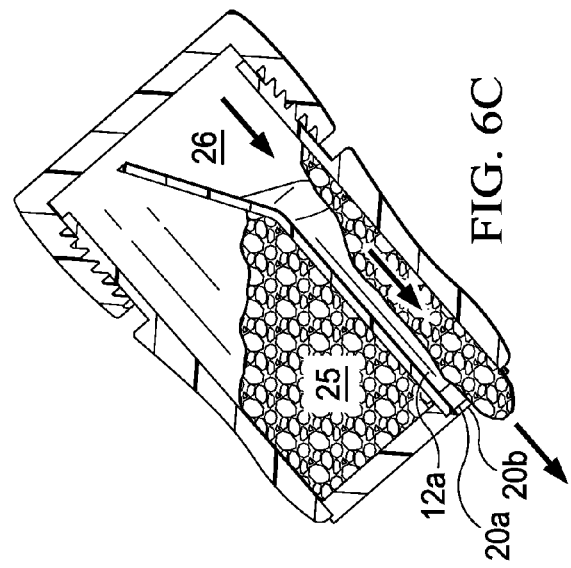
FIG. 6C depicts the dry product flow through the exit port of the dispenser.
Figure 6B:
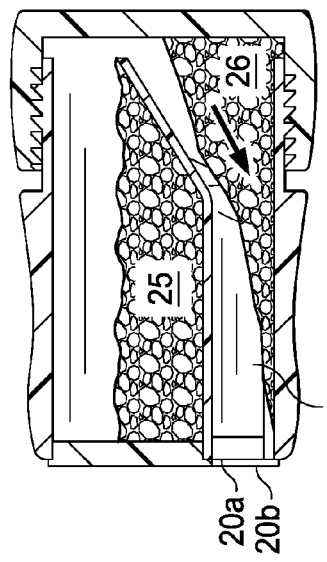
FIG. 6B depicts the dry product flow along the length of the product-dispensing compartment during dispensing.
Figure 6A:
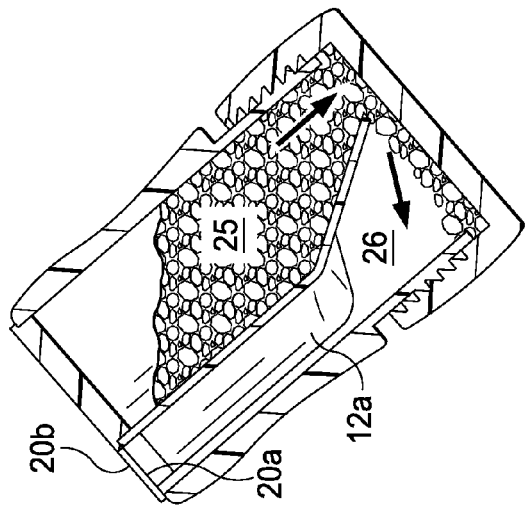
FIG. 6A depicts the dry product flow from the product storage area after adjustment of the volume compartment into the product-dispensing compartment during dispensing.

FIGS. 6A-C depict the flow of dry product 25 during dispensing according to one embodiment. To dispense product through the exit port 20b of the cap 14, once a desired amount of product is forced out of the opening 23 of the product storage area 24 through displacement of the volume adjustment compartment 16, the dry product dispenser 5 must be flipped from its upright position to take advantage of gravity. Essentially, after the dry product 25 flows from product storage area 14 through the opening 23 into the common area under the partition 12, flipping the dispenser 5 causes the dry product 25 to flow through the substantially vertical passageway of the product dispensing area 26 and then through the discharge port 20a of the second product dispensing area. FIG. 6A depicts the flow of dry product 25 when flipping of the dispenser is begun. As shown by the arrows, product 25 flows from the first product storage area 24 and into a common area 15 directly below the two sub-cavities 24, 26. As shown in FIG. 6B, as the dispenser 5 is further turned, product, which is essentially then within the second product dispensing area, travels through the passage formed in part by the elongated portion 12a therein and, as in FIG. 6C, out through the discharge port 20a, which is in direct communication with the exit port 20b. In one embodiment, the dispenser is turned from its upright standing position by an angle of at least 45 degrees for proper dispensing. Other embodiments that flip the dispenser greater than 45 degrees will allow for faster exit of dry product from the dispenser. During dispensing, only a very small amount of product (less than 1%) may re-enter the product storage area 24. Thus, the dispenser provides for consistent amount of dry product to be dispensed at any given time so long as the dispenser is flipped so that product rolls down between the first product storage area and the second product dispensing area.

The adjustable volume compartment 16 allows for various amounts of product 25 to be dispensed to account for different serving sizes, different products and/or different consumer preference, for example. Controlling the adjustable volume compartment directly effects how much product is dispensed. Generally, the further the adjustable volume compartment is displaced away from the body 10, the greater the volume of the common area 15 and the greater the amount of product dispensed. Conversely, a smaller common area 15 provides for a smaller dose of dry product. It should be noted that in some embodiments, the volume of the adjustment compartment could also be fixed to consistently deliver the same amount of product with every use.

Either the body 10 or the adjustable volume compartment 16 may comprise, on its exterior, marked measurements for consumer reference in some embodiments. The dispenser may further optionally comprise a product level window or similar indicator to show how much product has been dispensed or remains.

As evident by the above description, the dispenser described herein may be composed of or consist of only three separate parts-a body 10 with an internal partition 12 formed therein, a cap 14, and a volume adjustment compartment 16 in one embodiment. In another embodiment, the dispenser may consist of only four separate parts when internal partition 12 is made to provide a fourth separate piece while still providing for maximum use of the volume within the dispenser. As such, the dispenser is simple and easy to manufacture. In addition, the present design allows for maximum use of space within the dispenser.

The motion for dispensing is simple and convenient and can provide for one-handed operation with no additional components. No latch, no turnkey, no valve or valve system, no spring, no conveying tool, no separate measuring device, no rotating wheel, no metering screw, no rolling pin device, and no motorized drive mechanism is necessary.

In accordance with another aspect of the present disclosure, and in relation to FIGS. 7-10, an insertable partition is described for transforming a canister into a dry product dosage dispenser. The insertable partition 28 generally comprises an elongated portion 30 having an interior side 32 opposite an exterior side, and a first end opposite a second end; an inclined portion 34 extending down from the second end of the elongated portion at an angle, said angle negatively sloping away from the interior side and comprising a first surface that is an extension of the exterior side of the elongated portion 30 and an opposing second surface that is an extension of the interior side; and a supporting member 40 extending down from a bottom end of the inclined portion 34; wherein the inclined portion 34 comprises one of an opening between the first surface and the opposing second surface or a receding portion 38 along one edge.

The elongated portion 30 runs substantially vertically or vertically lengthwise and, when inserted into a canister 42, along one side or portion of the inner walls of the canister, making contact therewith. When inside the canister, the second end of the elongated portion 30 deviates from contact with the walls; more specifically, the interior side 32 of the elongated portion 30 curves away from the walls as it slopes and becomes the opposing second surface of the inclined portion 34. In one embodiment, the elongated portion 30 is semi-tubular and has an interior arc side, which becomes the opposing second surface of the inclined portion 34. In other embodiments, the elongated portion may also comprise a more box-like shape, for example, having two parallel sides and one side in between and perpendicular to the parallel sides to form a square-like passageway when inserted into a canister. The size or depth of the elongated portion 30 may vary according to the dry product to be dispensed. By way of example, the interior arc side of a semi-tubular portion 30 may comprise a depth/arc of between about 0.75 to about 1.75 inches.

In one embodiment, the transition between the elongated portion 30 and the inclined portion 34 is a seamless junction that provides a smooth surface for the dry product to slide down without being redirected or stopped. In one embodiment, a perimeter of the inclined portion 34 is symmetrical about the elongated portion. In one embodiment, the perimeter of the inclined portion 34 is symmetrical about the elongated portion 30 with the supporting member 40 consisting of a pair of legs, and the receding portion is C-shaped and along a bottom central edge in between the pair of legs. The length of the supporting member 40 may vary according to the desired volume of dry product to be dispensed. Generally, the longer the supporting member 40, the bigger the dry product dosage. Conversely, the shorting the length of the supporting member 40, the smaller the dry product dosage.

Figure 7A:
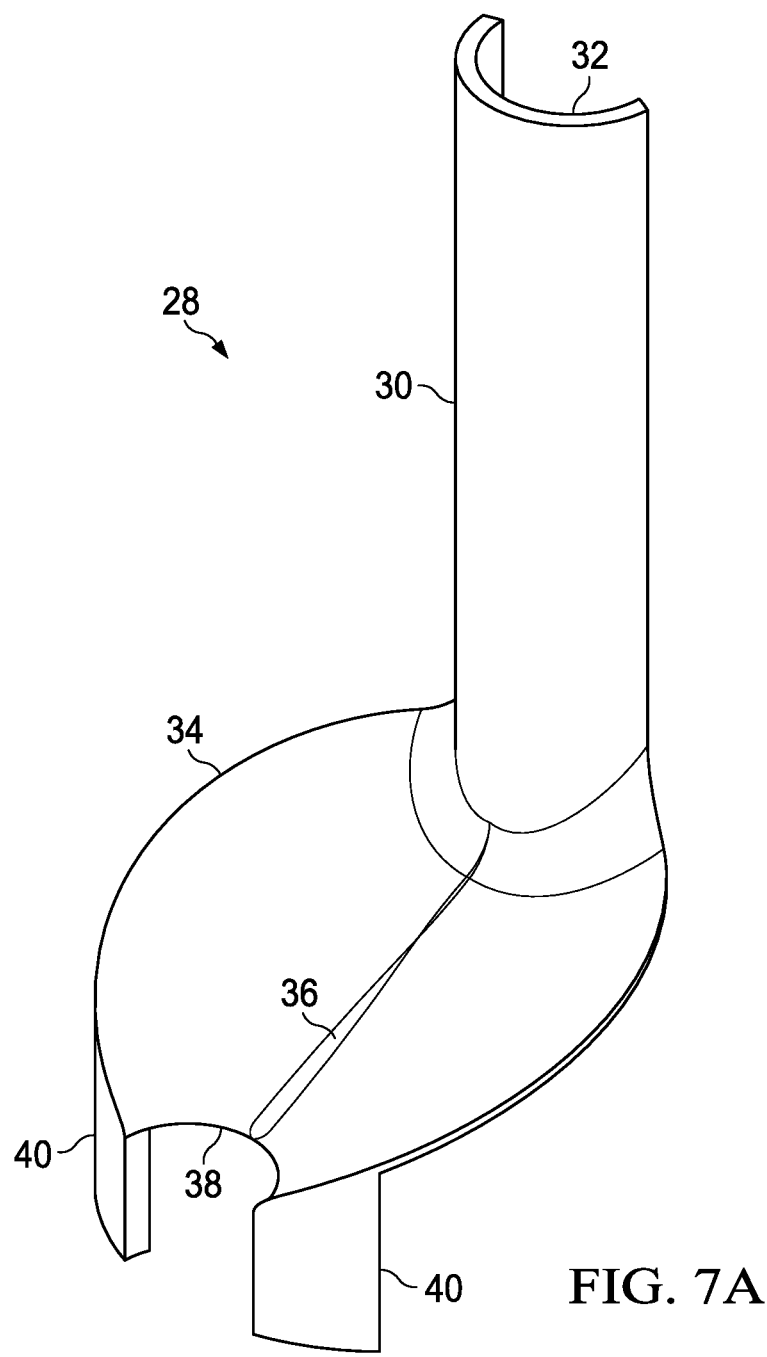
FIG. 7A depicts a perspective view of one embodiment of an insert according to one aspect of the present disclosure.
Figure 8:
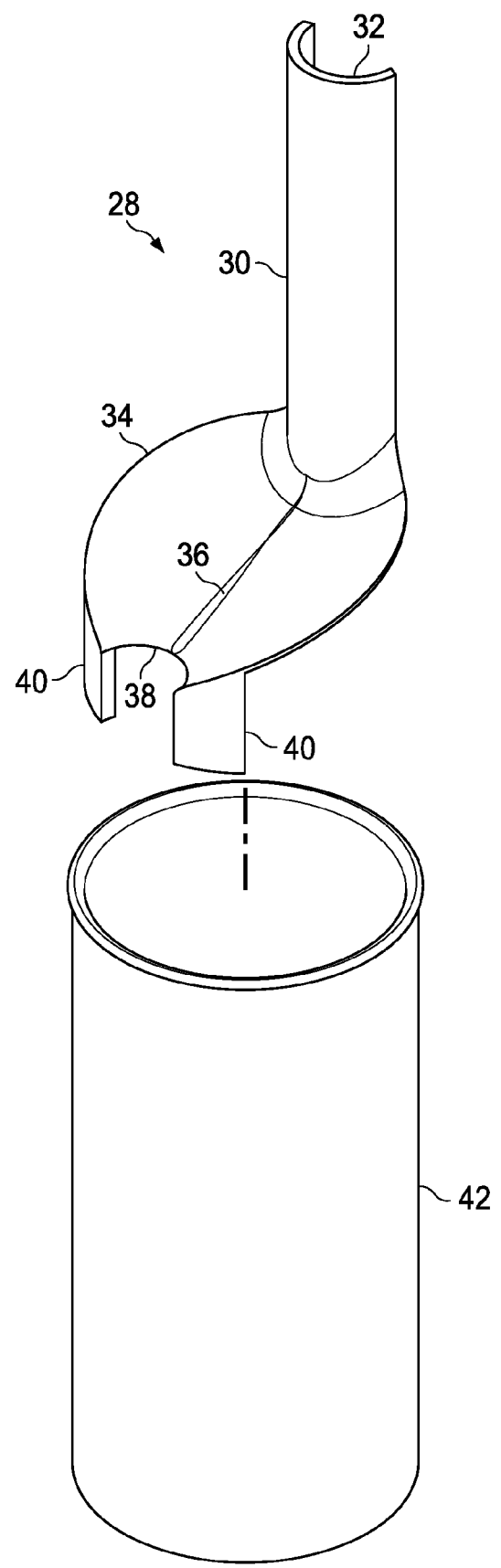
FIG. 8 depicts an exploded perspective view of the insert of FIG. 7A as introduced into a canister.

With reference to FIG. 7A, in one embodiment, the perimeter of the inclined portion 34 comprises a receding portion 38 along one edge. As used herein, a receding portion is meant to refer to an edge portion along the outer perimeter of the inclined portion that retreats back and towards the center of the inclined portion such that a gap is formed when the insertable partition is placed within the canister. In this embodiment, the inclined portion 34 comprises a perimeter of a shape to directly contact at least a substantial portion of an internal perimeter (or inner circumference) of the inner walls of a canister. In other words, when inserted into the canister, as shown in FIG. 8, the receding portion forms an opening along an edge of the inclined portion, which is in between the inclined portion and a wall of the canister.

Figure 7B:
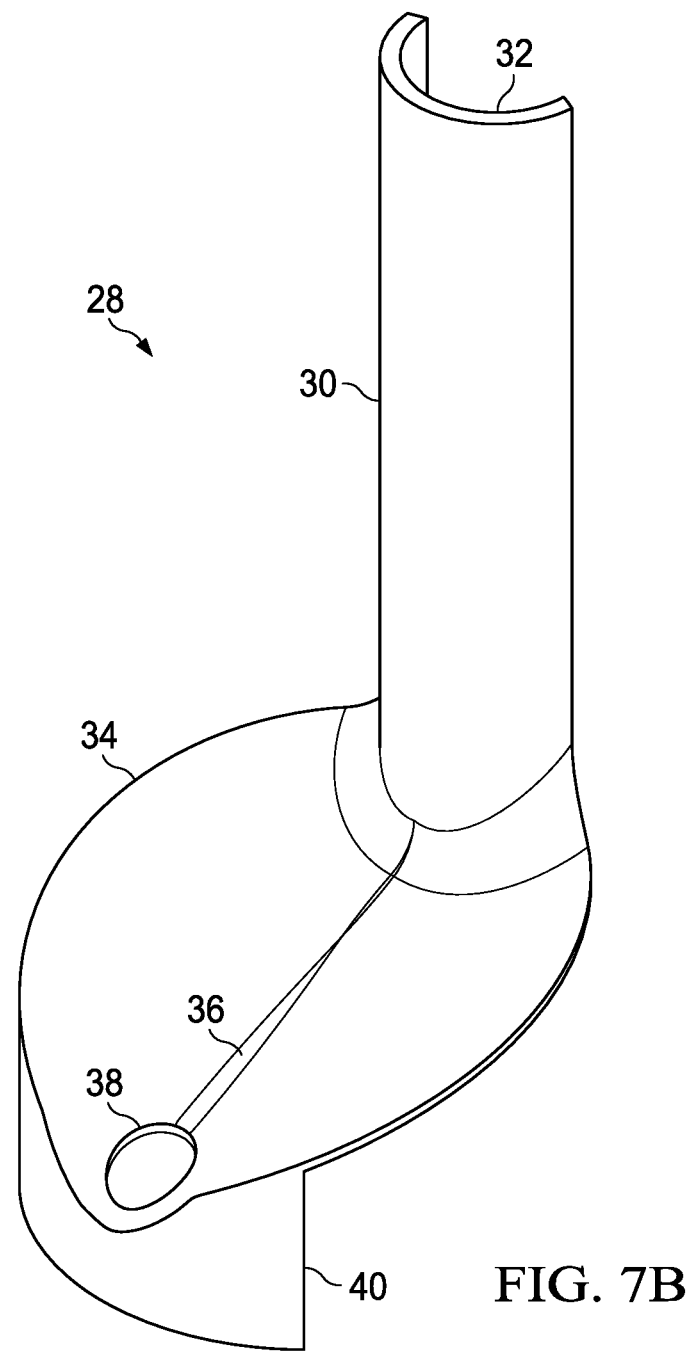
FIG. 7B depicts a perspective view of another embodiment of an insert.

With reference to FIG. 7B, in one embodiment, the inclined portion comprises an opening extending between the first surface and the second surface to allow for dry product to exit from a storage area for dispensing. In this embodiment, the perimeter of the inclined portion 34 extends fully out, with no receding portion, to directly contact an entire inner perimeter or inner circumference of the inner walls of a canister.

Figure 10:
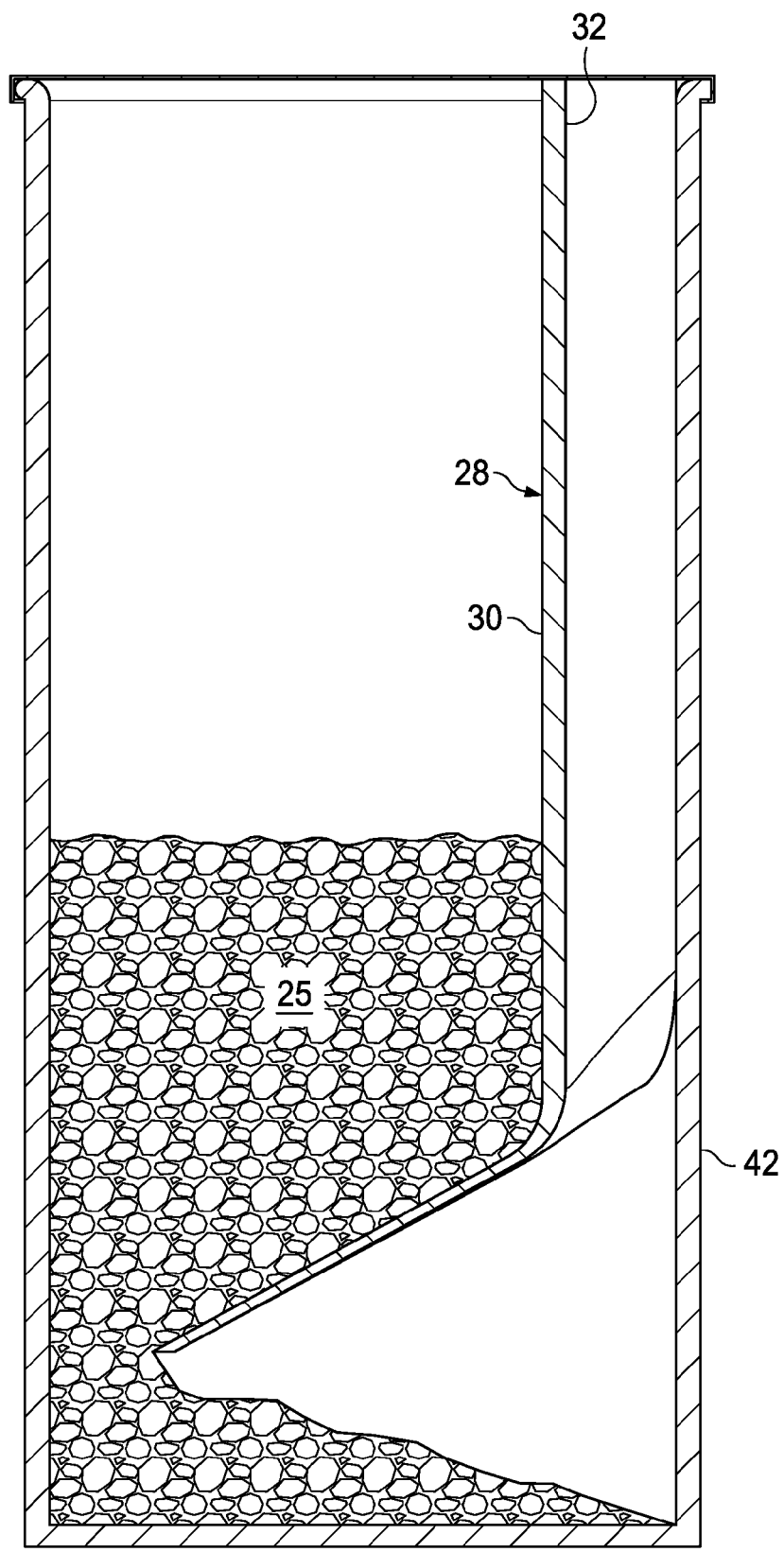
FIG. 10 depicts a cross-sectional view of an insert within a canister having dry product therein.

Thus, the insertable partition is shaped to leverage the inner walls of any container or canister into which it is inserted. FIGS. 9 and 10 depict a cross-section view of one embodiment of the insertable partition within a canister or container having a closed integral bottom end, with and without dry product therein, respectively.

In one embodiment, the first surface of the inclined portion is slightly concave and the opposing second surface is correspondingly convex. In one embodiment, the inclined portion 34 is curvilinear and slopes with respect to a circumferential direction and a radial direction. The inclined portion 34 may further comprise a banked perimeter to help funnel or guide dry product towards the opening or gap, which as described above is formed between a first product receiving area and a second product dispensing area when the partition is placed in a container with a body, or canister. Any number of angles would work for the banked portion so long as the edges slant such that product flows downward through the opening. In one embodiment, the inclined portion optionally comprises a second steeper slope 36 extending down to a centered point at the opening or receded portion 38 to further force product down through therethrough. The slope 36, when present, preferably comprises a seamless transition from the remaining inclined portion to allow for smooth flow of dry product.

Another aspect of the present disclosure relates to a method of forming a dry product dosage dispenser. The method generally comprising the steps of providing a container with an open (i.e., hollow) body having a first end and a second end with a cavity there between; forming two sub-cavities within the cavity with an internal partition that extends from the first end to the second end, wherein the internal partition comprises an inclined portion having a perimeter in direct contact with at least a substantial portion of an internal perimeter of the body and wherein the two sub-cavities consist of a first product storage area and a second product dispensing area; and capping at least a portion of the first end of the container; wherein the second end comprises a bottom piece selected from one of an integral closed end or an adjustable volume compartment movably connected to the second end of the body. The container and its cavities may then comprise any limitation as discussed above with regard to the figures.

In one embodiment, the capping step comprises covering the first product storage area. The cap should be secured to the first product storage area such that it remains in place when the dispenser is moved from its upright position. In one embodiment, the capping step comprises covering the first end of the body with a cap comprising a detachable portion, said detachable portion removable to expose an exit port for the dry product, wherein said exit port is in communication with a discharge port of the second product dispensing area. In one embodiment, the capping step comprises a removable cap.

As depicted in the figures, the internal partition together with an internal wall of the body form a substantially vertical passageway that extends down from the first end of the body before extending into the inclined portion. Thus, an opening or discharge port is formed on the first end. The substantially vertical passageway may be tubular or tube-like in one embodiment. Along some portion of the length of the container, the substantially vertical passageway deviates from the inner wall and into the inclined portion, which then inclines down into an opening at the second end of the container. In one embodiment, the opening of the substantially vertical passageway at the first end and/or the opening at the second end formed by the internal partition may be annular.

In one embodiment, the internal partition is curvilinear and comprises a slightly banked surface that slopes with respect to a circumferential direction and a radial direction. Accordingly, the dispenser is formed with an internal partition forming a funnel-type structure in each of the two sub-cavities, said funnel-type structure forming a wide upper opening opposite a narrow lower opening in each of the sub-cavities. Depending on the orientation of the container, only one of each sub-cavity will comprise the wide upper opening opposite narrow lower opening. That is to say, one end of the container will comprise a wide upper end of one sub-cavity and a lower narrow end of the other sub-cavity. In one embodiment, the internal partition is removable. In another embodiment, the internal partition is integrated with the body into a single structure.

The method of forming the dispenser may comprise providing an internal partition with one of an opening between two opposing surfaces or a receded portion along one edge, as described above. When the second end of the container comprises an integral closed end, the internal partition further comprises a supporting member extending down from the inclined portion. The supporting member may comprise a leg portion in one embodiment, or a pair of legs in another embodiment. In one embodiment, the internal partition comprises a leg portion at the bottom end of the inclined portion, said leg portion contacting the closed end integral to the body. When the second end of the container comprises an adjustable volume compartment, the method further comprises vertically adjusting the adjustable volume compartment to create a common area of space within the cavity, wherein said common area of space creates an open communication between the first product storage area and the second product dispensing area. As described above, the adjustable volume compartment may be vertically adjusted by being displaced away from the body to create a variable common area of space.

Any specific angles or specific sizes of the openings or exits provided herein help ensure consistent and more desirable (i.e., user-friendly) flow rates from the dispenser. However, changes to the geometry or any angles mentioned herein would still allow for dispensing of dry product though perhaps not delivering a consistent or specific dosage every time. Accordingly, discussion of angles and sizes is for illustrative purposes only and not intended to limit the scope of all embodiments unless otherwise noted.

FIGS. 11-24, described further below, depict further embodiments of a dry product dosage dispenser having more than one product storage area for more that one dry product to be dispensed through a product dispensing area. FIGS. 11-18 illustrate a dispenser with a fixed or integral bottom portion for the dispensing of multiple (i.e., more than one) dry product in predetermined, fixed amounts. FIGS. 19-24 depict a dispenser having an adjustable volume compartment as described above in conjunction with a body and internal partition providing for more than one product storage area. It should be noted that, apart from the internal partition, the remaining components of the majority of the embodiments discussed below are substantially similar or can be modified in similar ways as discussed above (i.e., container or body, cap and bottom ends of the body).

Figure 11A:
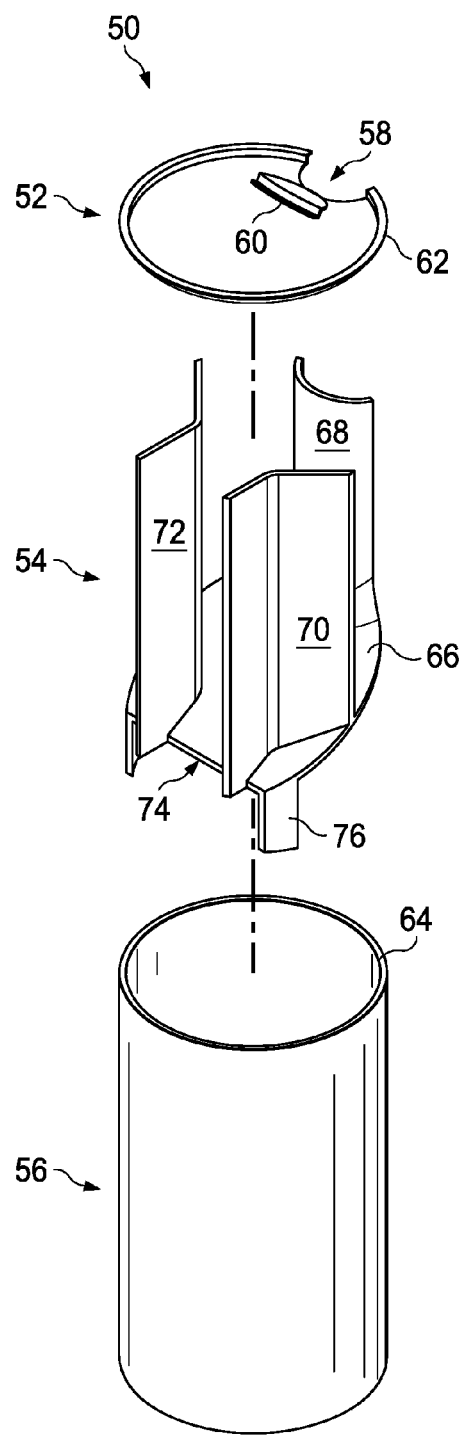
FIG. 11A depicts an exploded view of one embodiment of the dispenser.

In FIG. 11, there is depicted an exploded view of one embodiment of a dispenser 50 (in its upright position) for the dispensing of multiple dry products. The dispenser generally comprises a cap 52 for resting on the top end of a body 56 and an insert or internal partition 54 for placing within the body 56. When assembled together, the internal partition 54 may be integral to the body or dispenser or may be a separate and removable piece to be inserted into a body of similar shape to form the dispenser or removed as needed for cleaning, by way of example.

As shown in FIGS. 11-17, the dry product dosage dispenser 50 comprises a body 56 having a top end and a bottom end and a cavity surrounded by inner walls there between; a cap 52 on at least a portion of the top end of the body 56; and an internal partition 54 extending between the top end and the bottom end of the body 56, said internal partition comprising: a first elongated portion 68 having a first side 69a opposite a second side 69b, a first end 98a opposite a second end 98b, and edges 96a, 96b that meet with the inner walls of the body to form a product-dispensing chute 88 in the cavity; an inclined portion 66 extending from the second end 98b of the first elongated portion 68 and comprising a first surface 67a that is an extension of the first side 69a of the first elongated portion 68 and an opposing second surface 67b that is an extension of the second side 69b, said inclined portion 66 negatively sloping away from the chute 88 formed by the first elongated portion 68, wherein said inclined portion 66 comprises a surrounding perimeter that meets with the inner walls except at a perimeter bottom edge 74; and a second elongated portion 70 having a top end 102a opposite a base end 102b, the base end 102b extending from the first surface of the inclined portion 66, wherein the internal partition 54 divides the cavity into a first product storage area, a second product storage area, and a product dispensing area.

Turning back to FIG. 11, similar to the cap depicted above in FIGS. 3A and 3B, the cap 52 covers at least a portion of an end of the body 56. In one embodiment, the cap 52 substantially covers the top end of the body 56 with an opening or exit port 58 through which product may ultimately exit from the dispenser, as further described below. In one embodiment, the cap 52 entirely covers the periphery of the top end opening of the body 56, with an exit port 58 formed in the cap for dispensing of dry products. In one embodiment, the exit port 58 is along one edge of the cap 52 as depicted; however so long as the exit port is in communication with a product dispensing discharging port of a chute 88, the dispenser can effectively function as intended. For example, the exit port 58 may also be a smaller opening without interrupting the rim 62 of the cap 52, with the cap therefore having defined edges or a rim 62 all around it. Similarly, the shape of the exit port 58 is semicircular in one embodiment as depicted, however any number of shapes is acceptable so long as the exit port remains in communication with the product dispensing discharge port of the chute 88. The exposure of an exit port 58 aligned or in communication with the discharge port of the chute 88 may be incorporated into the cap by any means known in the art. The exit port 58 may be formed by a detachable portion, which may be either partially or fully removed to expose the exit port 58 (similar to the cap in FIG. 3a with score lines) or it may comprise a flip top cap 60 as shown in FIG. 11.

The cap 52 may be removable or permanent or integral to the top end, so long as it remains in place and covers the product storage areas during dispensing while allowing for the dry products to exit through an opening at the top end. In one embodiment, the cap 52 is removable to ensure easy access to and selectively expose the product storage areas within the body 56 for product receiving and storage. In another embodiment, the cap 52 is permanently fixed on one end to create a one-time only use disposable dispenser if desired. Embodiments having a permanently fixed cap integral to the entire first end of the body necessitate an exit port, access to, or formation of an exit port in the cap for dispensing of the dry product.

The cap may serve in part to seal in the dry products within the body when the dispenser is not in use. For sealing dry products within the body, the cap may cover all product storage areas formed by the insert, further described below, or it may cover the entire top end of the body 56. However, in embodiments where the cap 52 completely covers the entire top end of the body 56 or rim 64, the cap must be either removable or it must comprise a removable portion or opening 58 at a part of the cap in communication with a discharge port 88. The product storage areas must remain capped or closed at the end near the cap during dispensing, whether through use of a separate seal, lid or cap, whether permanently or temporarily in place. When the dispenser is assembled, and prior to use by a consumer, the cap may comprise a tamper-proof type seal, similar to that shown in FIG. 3a, which covers the entire top end and rim at the top end of the body 56.

In one embodiment, the cap 52 comprises a circumferential rim or flange that engages, locks or seals against the top end 64 of the body 56. As shown in FIG. 11, in one embodiment, the bottom of the cap 14 may comprise a circumferential lip 62 around its perimeter, which engages with a rim 64 of the body 56. In one embodiment, the lip 62 securely fits around the rim 64 and ensures a snug fit that is maintained during dispensing processes (i.e., when the dispenser is turned upside down or rotated up to 180 degrees or more). While the cap 52 shows a lip 62 for engaging with the rim 64, any secure or tight connection between the cap 52 and the body 56 is acceptable so long as the cap remains in place during dispensing. For example, the cap may also comprise threading or other snap fit connections. In one embodiment, the cap 52 is substantially flat. In one embodiment, the cap 52 comprises flat external side and a flat internal side. Any cap shape that forms a seal with at least some portion of one end of the body 56 is possible. In some embodiments, the cap will engage with top or uppermost ends of the elongated portions further described below to seal dry product within different compartments formed by the elongated portions of the internal partition.

The body 56 may be similar to the body 10 or the container 42, described above. In one embodiment, the body 56 comprises a cylindrical shape. However, it should be noted that the body may comprise any number of shapes, including without limitation box, square, cube, triangular, ovular, or irregular shapes having one or more different shapes, so long as the other limitations are met to provide for flow of the dry products from the storage areas and into the product dispensing area as described herein.

As discussed above, the internal partition 54 may be integral with the body 56 or it may be formed as a separate and therefore removable piece of a multiple dry product dispenser described herein. Generally, those embodiments comprising a separate or removable partition comprise a supporting member as further described below. It should be noted that as used herein, the terms "internal partition" and "partition" are used interchangeably. The "bottom perimeter edge" of the inclined portion of the partition is also referred to herein as the "bottom edge" of the inclined portion. The terms "product storage area" and "product storage compartment" are also used interchangeably.

Figure 11B:
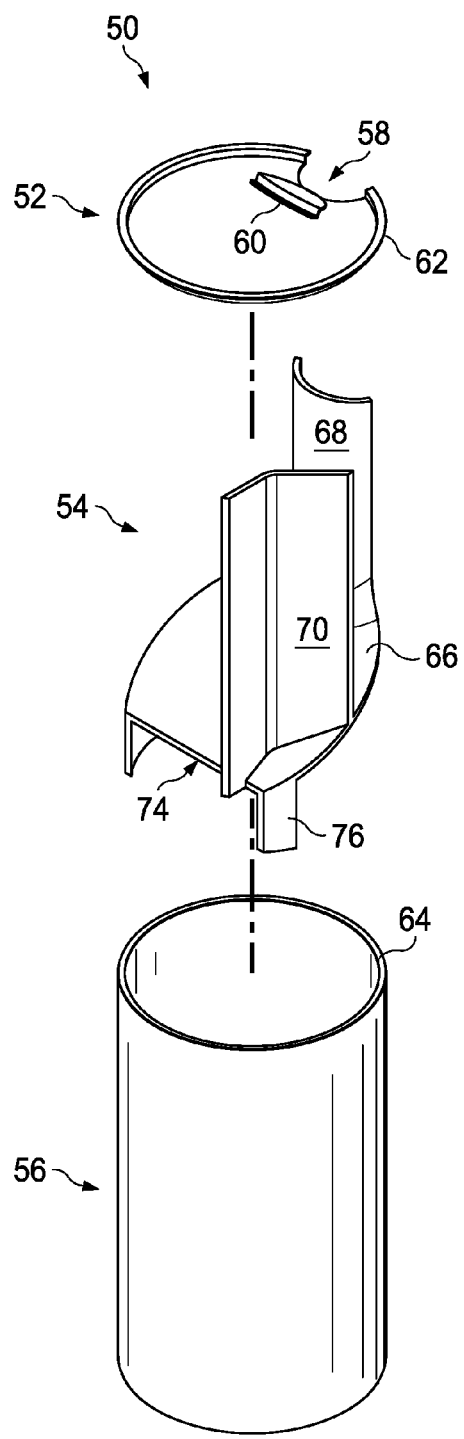
FIG. 11B depicts an exploded view of another embodiment of the dispenser.
Figure 12A:
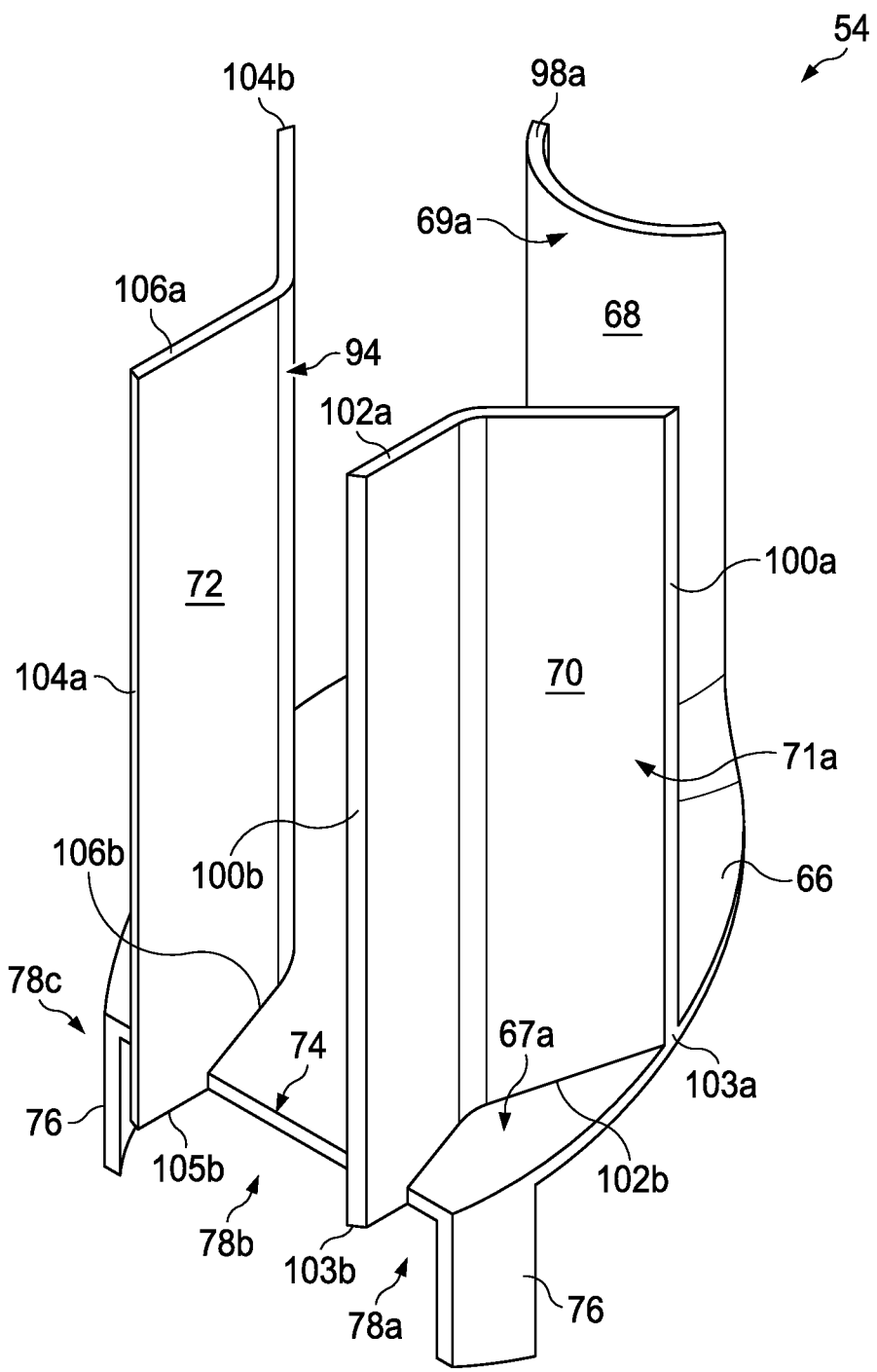
FIG. 12A depicts a perspective view of an insert according to one embodiment.
Figure 12B:
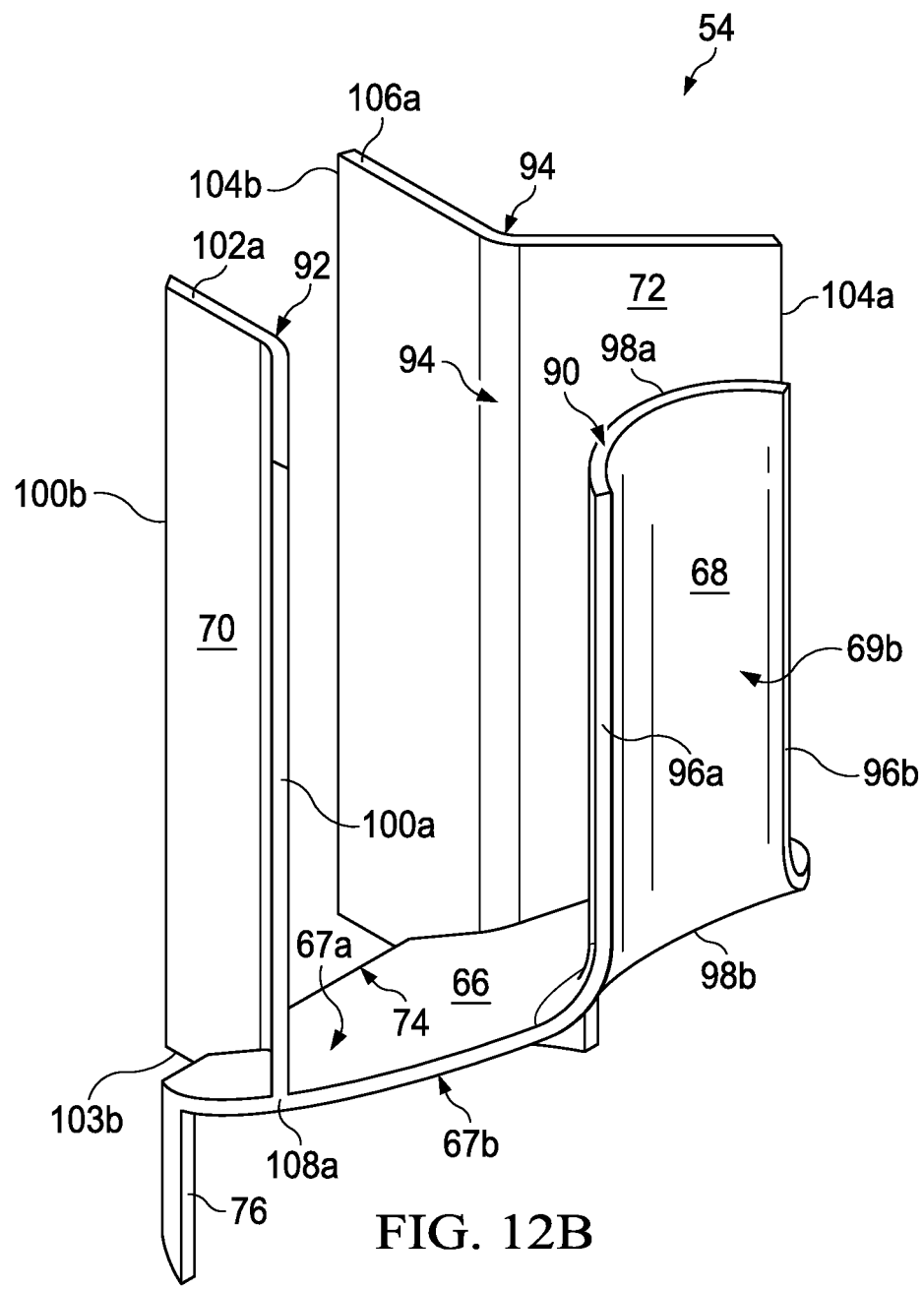
FIG. 12B depicts another perspective view of the insert of FIG. 12A.
Figure 13:
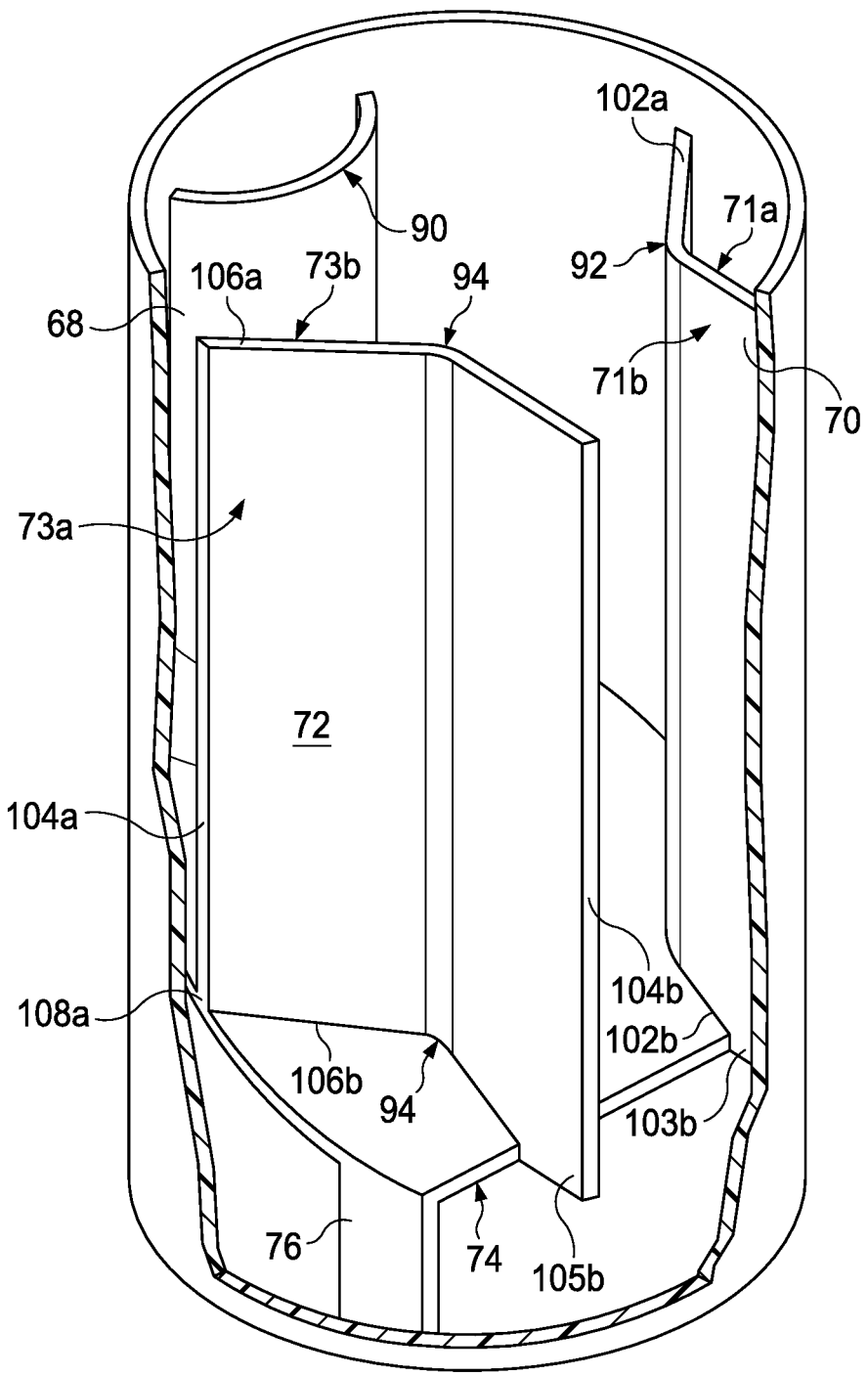
FIG. 13 depicts a perspective view of one embodiment of the dispenser without the cap having dry product therein.

FIGS. 12A, 12B, and 13 depict an embodiment of a partition for transformation a canister with inner walls into a dry product dosage dispenser, or a removable insert embodiment. The partition comprises a first elongated portion 68 having a first side 69a opposite a second side 69b, and a first end 98a opposite a second end 98b, said first elongated portion 68 forming a channel for conveying dry product along and within or on its second side 69b; an inclined portion 66 extending down from the second end 98b of the first elongated portion 68 and comprising a first surface 67a that is an extension of the first side 69a of the first elongated portion 68 and an opposing second surface 67b that is an extension of the second side 69b, said inclined portion 66 sloping down from the first elongated portion 68 to a bottom edge 74 of the inclined portion; and a second elongated portion 70 having a top end 102a and a base end 102b, the base end 102b extending from the first surface 67a of the inclined portion 66 and wherein the second elongated portion 70 forms a first compartment for storage within its exterior surface 71a and a second compartment for storage outside of the first compartment. In one embodiment, a part 103b of the base end 102b of the second elongated portion 70 extends beyond the bottom edge 74 to an inner wall of the body. In one embodiment, the part 103b extends below the second surface 67b of the inclined portion 66. As best shown in FIG. 13, the second compartment for storage lies adjacent to the inner surface 71b of the second elongated portion 70, opposite to its exterior surface 71a. In one embodiment, the second compartment for storage lies substantially within the inner surface of the second elongated portion. When inserted into a body or container as depicted in FIG. 13, compartments are formed with the second elongated portion serving as a divider for the portion of the internal partition 54 outside of the chute formed by the first elongated portion 68. In one embodiment, depicted by the figures, a third elongated portion also serves as a divider, forming another compartment. While the figures depict three elongated portions, the partition 54 may comprise only first and second elongated portions 68, 70 in one embodiment (FIG. 11B). Such configuration provides for a product dispensing chute formed by the first elongated portion 68 and two compartments formed by the second elongated portion 70, allowing for a first dry product storage compartment and a second dry storage compartment on opposing sides of the second elongated portion 70.

In one embodiment, the first surface 67a of the inclined portion 66 and its opposing second surface 67b are substantially parallel. In one embodiment, the inclined portion 66 is symmetrical about the first elongated portion 68. In one embodiment, the inclined portion 66 comprises a surrounding perimeter of a shape to directly contact the inner walls of a corresponding body into which it will be inserted, except along the bottom edge 74 of the inclined portion 66.

The first side 69a of the first elongated portion 68 faces the interior of the partition 54 and therefore makes up its interior side; and the second side 69b of the first elongated portion 68 faces the exterior of the partition 54 and therefore makes up its exterior side. In one embodiment, as depicted in the FIGS. 11-17, the first side 69a of the first elongated portion 68 is convex and the second side 69b of the first elongated portion 68 is concave. Thus, the first elongated portion 68 forms a channel in which dry product may pass or be conveyed through or on its second side 69b, which is on the exterior side of the partition 54. In one embodiment, the channel is U-shaped or semi-tubular. However, the channel formed by the first elongated portion 68 may also be angular, V-shaped, three-sided, or any other shape so long as product may be conveyed thereon. As used herein, a channel is not meant to be limited to a tubular or semi-tubular shape as but also extends to any groove or trough-like shapes. Preferably, the first elongated portion 68 comprises side edges 96a, 96b that extend from its first end 98a to its second end 98b. Side edges 96a, 96b should be shaped to meet with inner walls of the container (or body 56) into which it is meant for insertion and use. In other words, the shape of the side edges 96a, 96b should be such that a chute is formed in the area between the second side 69b of the first elongated portion and adjacent inner walls of a container into which it may be inserted. In one embodiment, as illustrated in FIGS. 11-17, the side edges 96a, 96b are substantially vertical or parallel to the inner walls. However, other embodiments are also possible so long as dry product can be properly dispensed as described herein. In one embodiment, the first elongated portion 68 is substantially vertical from its first end 98a to its second end 98b when the dispenser is in its upright position.

The second elongated portion 70 is substantially vertical from its top end to its base end when the dispenser is in its upright position in one embodiment. In one embodiment, the first and second elongated portions are each substantially vertical or generally parallel to one another. In one embodiment, the top end of the second elongated portion and the first end of the first elongated portion fall within the same horizontal plane above the inclined portion 66. However, the lengths of each of the first and second elongated portions may vary so long as some other wall, extension, insert or component helps form the compartment for passage and/or storage of a dry product; for example, a wall or extension from the interior part of the cap may be used to help form a compartment or division of the partition.

In one embodiment, as depicted in FIGS. 12A and 12B, the second elongated portion 70 forms a trough-like compartment in which dry product may be stored on or within the exterior surface 71a, which is on the exterior side of the partition 54, facing away from the center 81 of the inclined portion 66 and opposite the inner surface 71b of the second elongated portion 72. In one embodiment, the second elongated portion forms a concave V-shaped exterior surface. However, the exterior surface 71a of the second elongated portion may comprise a V-shape, U-shape, three-sided shape, semi-circular, semi-tubular or any other shape so long as a first compartment for storage of a first dry product is formed on one side of the second elongated portion and a second compartment for storage of a second dry product is formed on the opposite or inner side 71b of the second elongated portion, outside the first compartment. The first and second compartments for storage are thus found above the first surface 67a of the inclined portion, outside of the chute. Preferably, the second elongated portion 70 comprises side edges 100a, 100b that extend from its top end 102a to its base end 102b. In one embodiment, the second elongated portion 70 comprises a first vertical side edge 100a extending from its top end 102a to its base end 102b at the first surface 67a of the inclined portion 66 and a second vertical side edge 100b extending its top end 102a to a base end 103b below the second surface 67b of the inclined portion. Side edges 100a, 100b should be shaped to meet with inner walls of the container (or body 56) into which it is meant for insertion and use. In other words, the shape of the side edges 100a, 100b should be such that an enclosed storage area is formed between inner walls of a body or container and the exterior surface of the second elongated portion. In one embodiment, as illustrated in FIGS. 11-17, the side edges 100a, 100b are substantially vertical or parallel to the inner walls. However, other embodiments are also possible so long as dry product can be enclosed, stored and dispensed as described herein.

In another embodiment, depicted in FIGS. 12A and 12B, the partition 54 may further comprise a third elongated portion 72 having a bottommost end 106b extending from the first surface 67a of the inclined portion 66 outside of the first compartment formed by the second elongated portion 70, and wherein the third elongated portion 72 forms a third compartment for storage within its exterior surface 73a. Thus, the third elongated portion 72 breaks up the second compartment for storage into second and third compartments for storage. In one embodiment, a part 105b of the third elongated portion 72 extends beyond the bottom edge 74. In one embodiment, the part 105b extends below the second surface 67b of the inclined portion 66. Similar to the second elongated portion 70, the third elongated portion 72 forms a trough-like compartment in which dry product may be stored on or within its exterior surface 73a, which is on the exterior side of the partition 54, facing away from the center 81 of the inclined portion 66 (shown best in the top view of FIG. 16) and opposite the inner surface 73b of the second elongated portion 72. In one embodiment, the third elongated portion 72 forms a concave V-shaped exterior surface. However, the exterior surface of the third elongated portion may comprise a U-shape, three-sided shape, semi-circular, semi-tubular or any other shape so long as a third compartment for storage of a third dry product is formed on its exterior surface 73a, and a second compartment for storage of a second dry product remains within a central portion of the partition 54. Preferably, the third elongated portion 72 comprises side edges 104a, 104b that extend from its uppermost end 106a to its bottommost end 106b. In one embodiment, the third elongated portion 72 comprises a first vertical side edge 104a extending from the its top end 106a to its base end 106b at the first surface 67b of the inclined portion 66 and a second vertical side edge 104b extending from its top end 106a to a base end 105b below the second surface 67b of the inclined portion 66. Side edges 104a, 104b should be shaped to meet with inner walls of the container (or body 56) into which it is meant for insertion and use. In other words, the shape of the side edges 104a, 104b should be such that an enclosed storage area is formed in the area between the exterior walls of the third elongated portion and the adjacent inner walls of the container or body 56 upon insertion of the partition into a corresponding body. In one embodiment, as illustrated in FIGS. 11-17, the side edges 104a, 104b are substantially vertical or parallel to the inner walls. However, other embodiments are also possible so long as dry product can be enclosed, stored and dispensed as described herein. The third elongated portion 72 is substantially vertical from its uppermost end 106a to its bottommost end 106b when the dispenser is in its upright position in one embodiment. In one embodiment, the first, second and third elongated portions are each substantially vertical or generally parallel to one another. In one embodiment, the top end 102a of the second elongated portion 70, the uppermost end 106a of the third elongated portion 72, and the first end 98a of the first elongated portion 68 all fall within the same horizontal plane above the inclined portion 66. However, the lengths of each or all of the first, second and third elongated portions may vary so long as some other wall, insert or portion helps form the compartment for passage and/or storage of a dry product. For example, one or more walls or extensions from the cap may be used to help form a compartment, division or chute of the partition.

As perhaps best shown in FIGS. 11-14, the partition 54, when formed as a separate, removable piece, comprises a supporting member 76 extending down from the second surface 67b of the inclined portion 66. The supporting member 76 is meant to provide for the container, into which it is inserted, a set or predetermined volume for dispensing. Thus, the supporting member, helps determined the volume of the common space or area into which product flows for dispensing through the chute. In one embodiment, the supporting member 76 comprises a pair of supporting legs extending down from the second surface 67b to the floor of the body 56. As with the supporting member 40, described above, the length of the supporting member 76 may vary according to the desired volume of dry products to be dispensed. Generally, the longer the supporting member 76, the bigger dosage of the dry products. Conversely, the shorting the length of the supporting member 76, the smaller the dosage of the dry products. In one embodiment, the pair (i.e., two) of supporting legs extends down adjacent from opposite ends of the bottom edge 74. However, one skilled in the art armed with this disclosure can place the supporting member, if desired, anywhere along the partition so long as the flow of product is not obstructed.

With reference to FIG. 13, in one embodiment, each of the elongated portions 68, 70, 72 comprises a vertex 90, 92, 94 (respectively) extending vertically down the length of the elongated portion from end to end. The vertices may face toward the center 81 of the inclined portion 66 (shown in FIG. 16) in one embodiment and may each be placed anywhere on the first surface 67a of the inclined portion 66 so as to maximize or minimize the size of compartments for dry product storage as desired. The rounded or arched shape of the first elongated portion, in one embodiment, may provide for smoother flow of product from the dispenser as further described below. In other embodiments, all elongated portions may comprise a rounded vertex or semi-circular shape, or all may comprise an angular shape with a pointed edge as in second and third elongated portions 70, 72. In other words, in one embodiment, the first, second and third elongated portions are curvilinear or angular, each of which comprising a shape with a vertex pointing away from a surrounding perimeter of the inclined portion. These vertices are entirely optional, however, and other shapes are also possible for the dividing elongated portions, as discussed above, so long as the elongated portions divide the open areas of the cavity into separate storage compartments.

Figure 14:
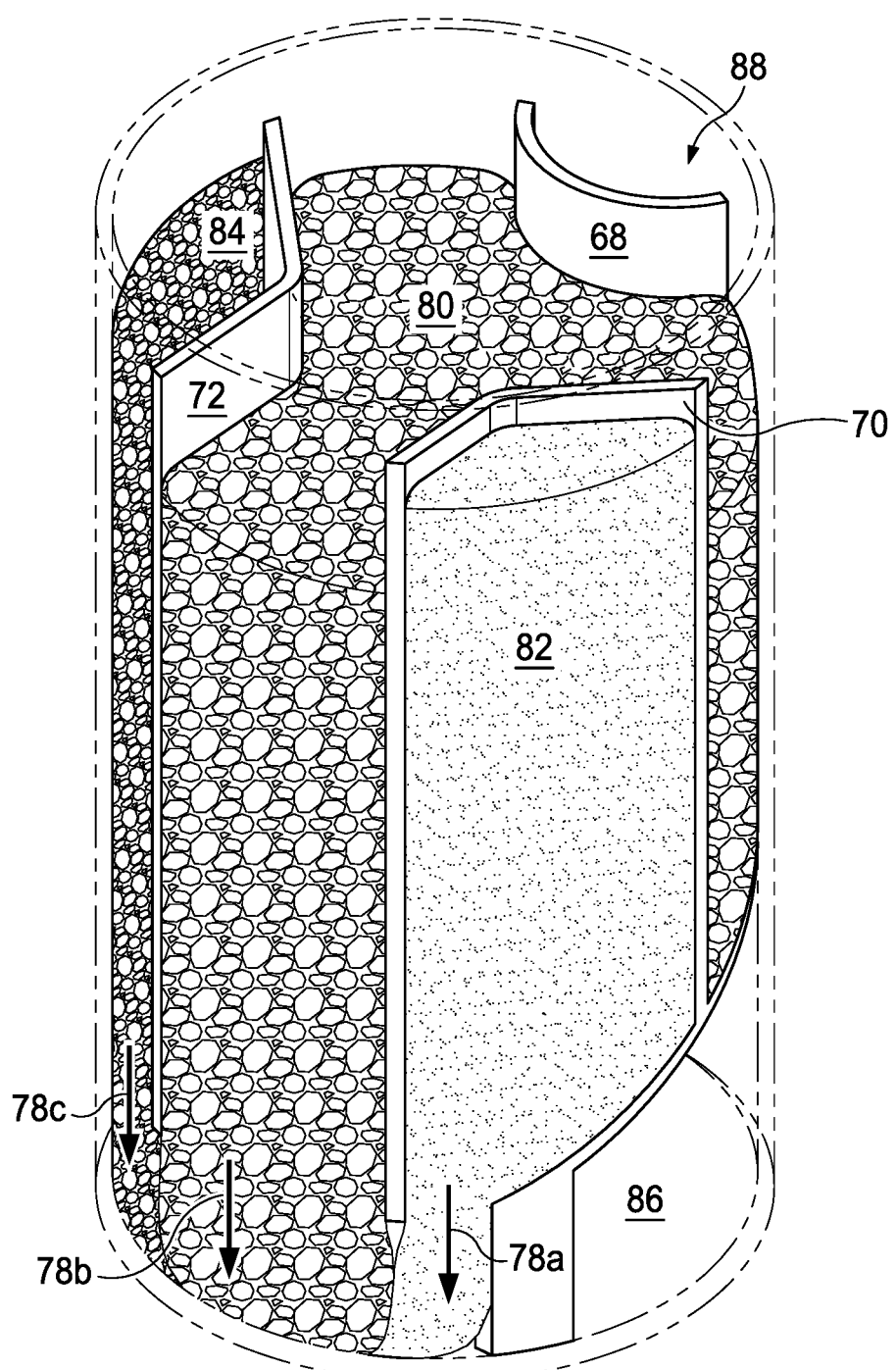
FIG. 14 depicts a cutaway view of the dispenser in one embodiment.

FIG. 14 depicts the internal partition within a body and having dry product therein. As depicted in this Figure, the partition provides for the storage of a first dry product 82, a second dry product 80 and optionally a third dry product 84. To best depict the dry products, the body is shown in dashed lines and the dispenser is shown without a cap. Due to the sizes of the compartments for storage of the first and optionally third dry products, it can be seen that the second storage compartment, where the second dry product 80 is found, is the largest in volume in one embodiment. Such proportion, for example, would allow for a larger amount of the second dry product 80 to be dispensed. Each storage compartment comprises an opening between the bottom perimeter edge 74 and an inner wall of the body, such opening controls the dose size of each dry product contained therein.

Any number of proportions for each of the storage compartments may be possible through changes in the shape of the elongated portions; in particular through modifications in the shapes of the second elongated portion 70 and/or the optional third elongated portion 72. As stated above in the first paragraph of this description, any number of dry products may be suitable for use with the present invention.

Figure 15:
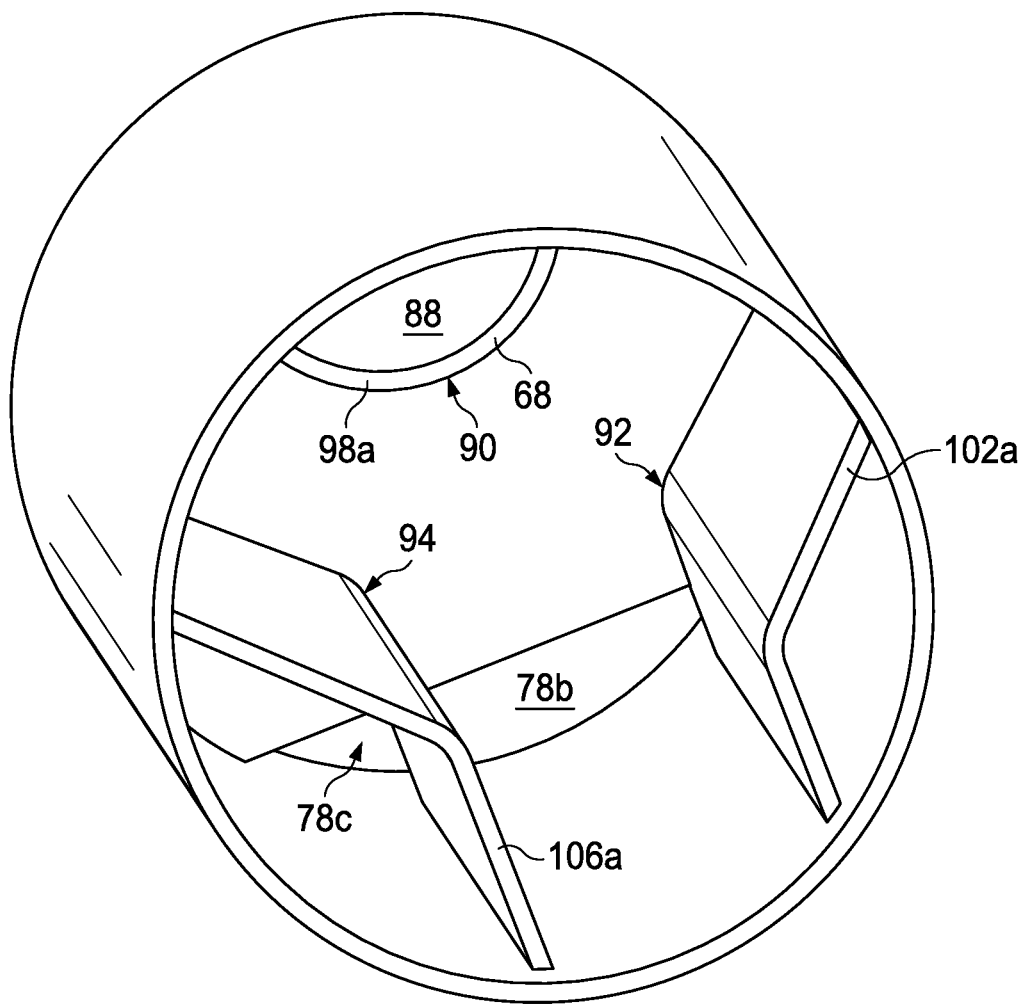
FIG. 15 depicts a top perspective view of the dispenser in one embodiment without the cap.
Figure 16:
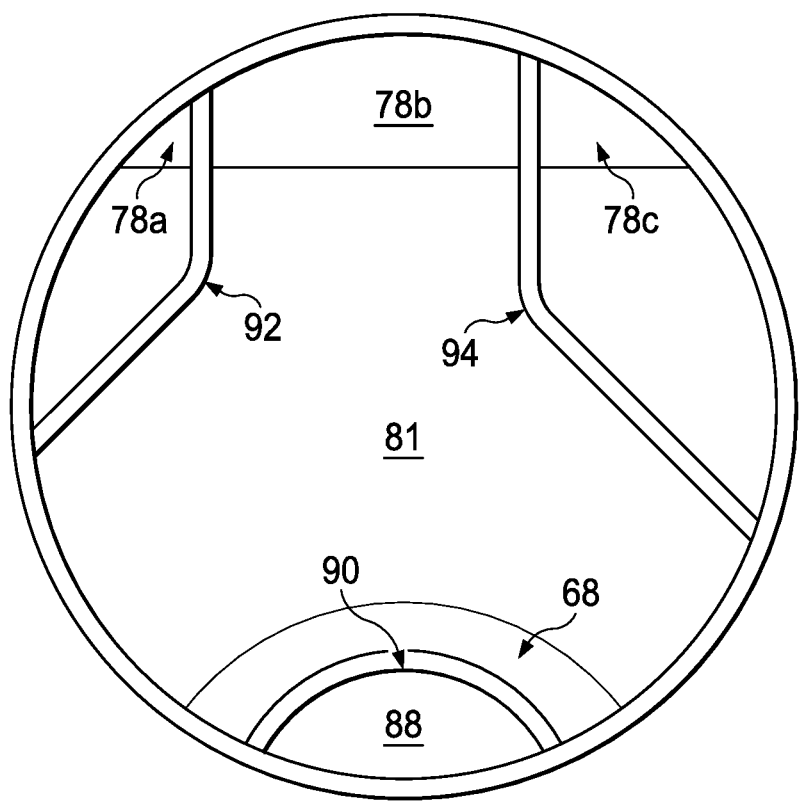
FIG. 16 depicts a top view of the dispenser in one embodiment without the cap.
Figure 17:
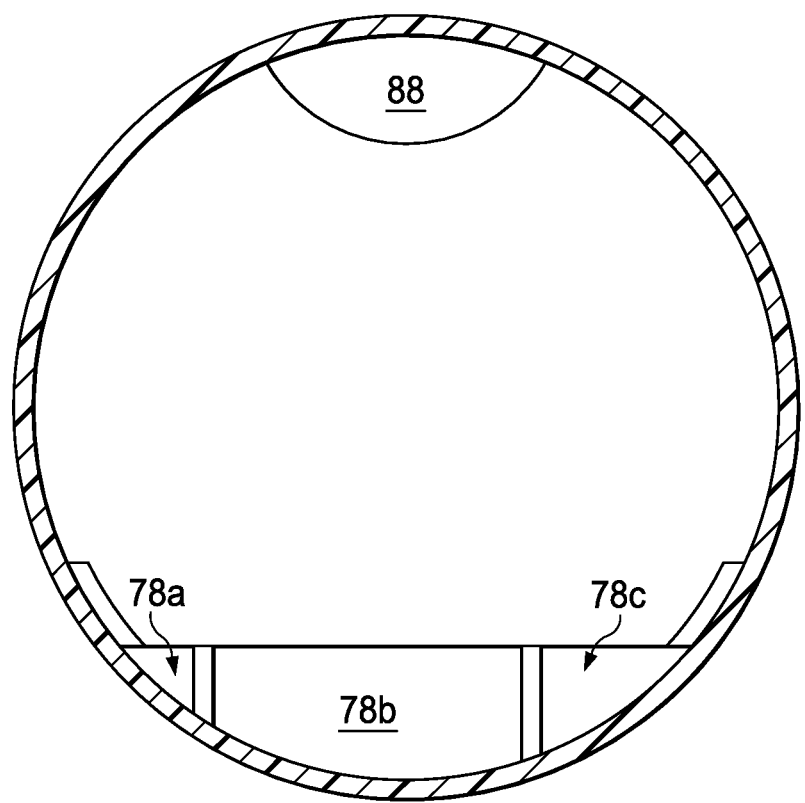
FIG. 17 depicts a bottom view of the dispenser in one embodiment.

FIG. 14 also depicts the flow of the first, second, and optional third dry products from the first, second, and optional third product storage areas or compartments, respectively. As shown by the arrows 78a, 78b, 78c, the dry products 82, 80, and 84, in each of the storage compartments formed by the internal partition, simultaneously travel down from their respective storage areas under the influence of gravity. More specifically, the bottom edge 74 of the inclined portion 66, which does not meet the inner walls of the body 56, allows for a spillover of a dry product from its respective storage compartment or area down into a common area 86 under the inclined portion 66. In one embodiment, the shape of the bottom perimeter edge or bottom edge 74 of the inclined portion allows for products from the first, second, and optional third compartments or areas to pass down through to a common area, which makes up the first part of a product dispensing area. In one embodiment, the bottom perimeter edge 74 is substantially straight while passing through each of the compartments. Other shapes of the bottom perimeter edge 74 are also contemplated within the scope of this disclosure so long as the depicted spillover remains possible. The perimeter bottom edge 74 is thus recessed away from the inner walls, allowing for dispensing of a first dry product from the first product storage area and a second dry product from the second product storage area to a common area 86 directly beneath the second surface of the inclined portion, said common area in direct communication with the product dispensing area formed in part by the first elongated portion. Put differently, the product dispensing area of the body's cavity comprises or consists of 1) a common area 86, which is below the inclined portion, and 2) the product-dispensing chute 88 formed by the first elongated portion 68. FIGS. 15-17 also depict the passageways formed by the recessed perimeter bottom edge or bottom edge 74 of the inclined portion 66. In these Figures, it is also easily seen how the shape of the elongated portions dictates the volume of each of the storage areas, outside of the chute portion 88. Such sizing can assist not only with proportion but also can vary due to the size of the dry product desired for dispensing. Simultaneous dispensing thus allows for a variety of dry products to be introduced into the dispenser and then dispensed at the same time to allow for a blend of the dry product having a consistent proportion of each dry product, regardless of varying size or weight between the dry products. One skilled in the art, armed with this disclosure, will recognize that the dispensers described herein solve the problem that occurs when different dry products having different weights, for example, are placed in the same package. In these situations, the different dry product typically dispense awkwardly given that the heavier product will sink down to the bottom and therefore be very unevenly dispensed creating an undesired mix with each serving made by the consumer. The dosage dispenser described herein, on the other hand, provides for easy and consistent dispensing of each dry product introduced therein. Each time a serving is prepared for consumption, the dispensing is as simple as described herein, with no mixing, stirring or scooping from various areas or depths of the container.

Figure 18A:
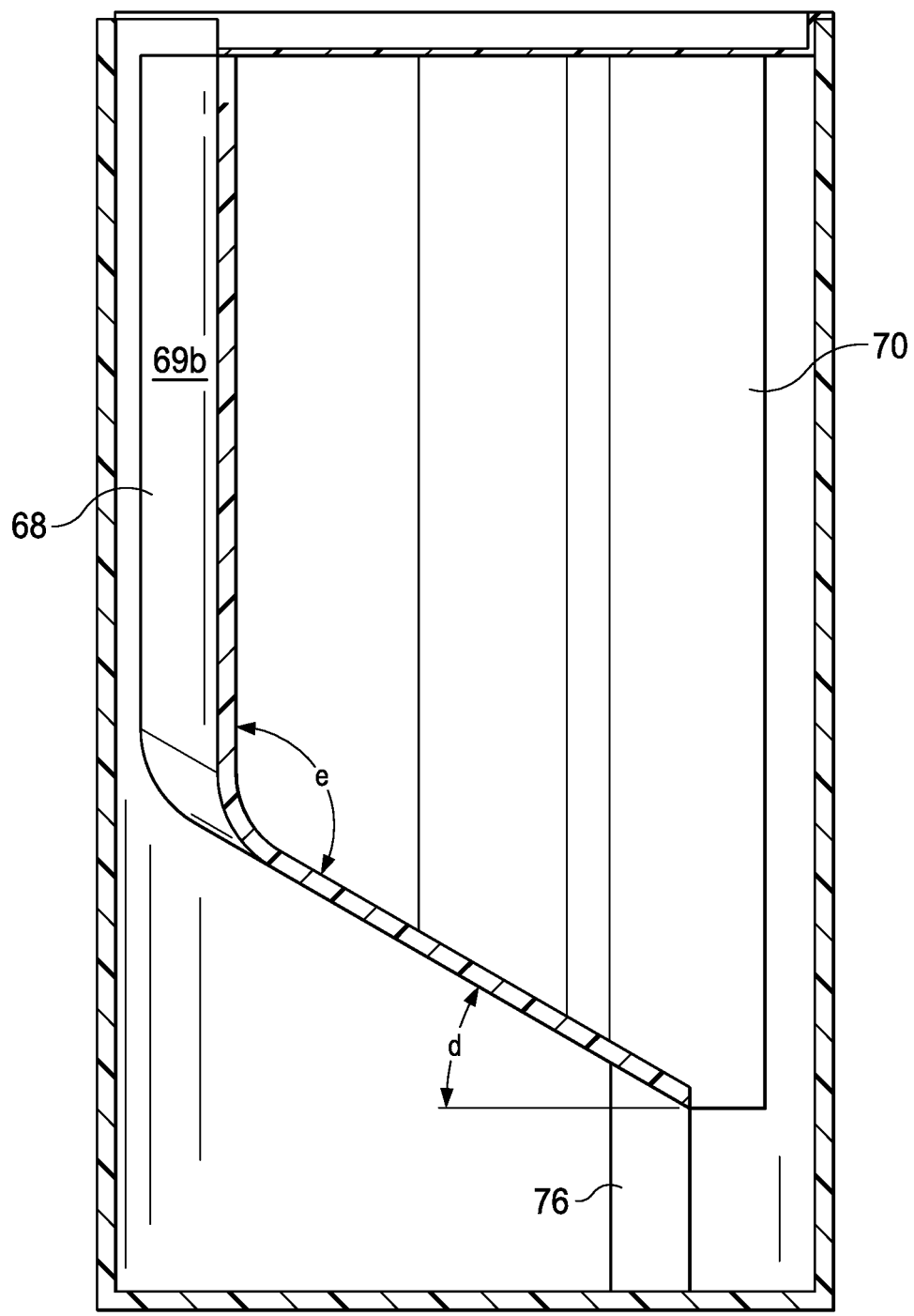
FIG. 18A depicts a cross sectional view of one embodiment of the dispenser without dry product therein.

FIG. 18A illustrates a cross sectional view of one embodiment of the dispenser without dry product therein. Due to its cross-sectional view, shown in FIG. 18A is one embodiment comprising only the first elongated portion 68 and the second elongated portion 70. In one embodiment, the inclined portion 66 comprises an obtuse angle e as it slopes downward relative to the first side 69a of the first elongated portion, and forms an inclined angle on both its top and bottom surfaces. The angle e may vary depending upon the size, length, perimeter or circumference of the body 10 so long as the inclined portion 66 provides an inclined first surface on which dry product is forced downwards. In one embodiment, the angle e may range from about 100 to about 145 degrees. In one embodiment, the angle e may range from about 115 to about 135 degrees. In one embodiment, the angle e comprises between about 125 to about 130 degrees. Angle d, below the inclined portion 66 should also provide for an inclined second surface 67b of the inclined portion 66. In one embodiment, angle d may range from about 10 to about 30 degrees.

Figure 18B:
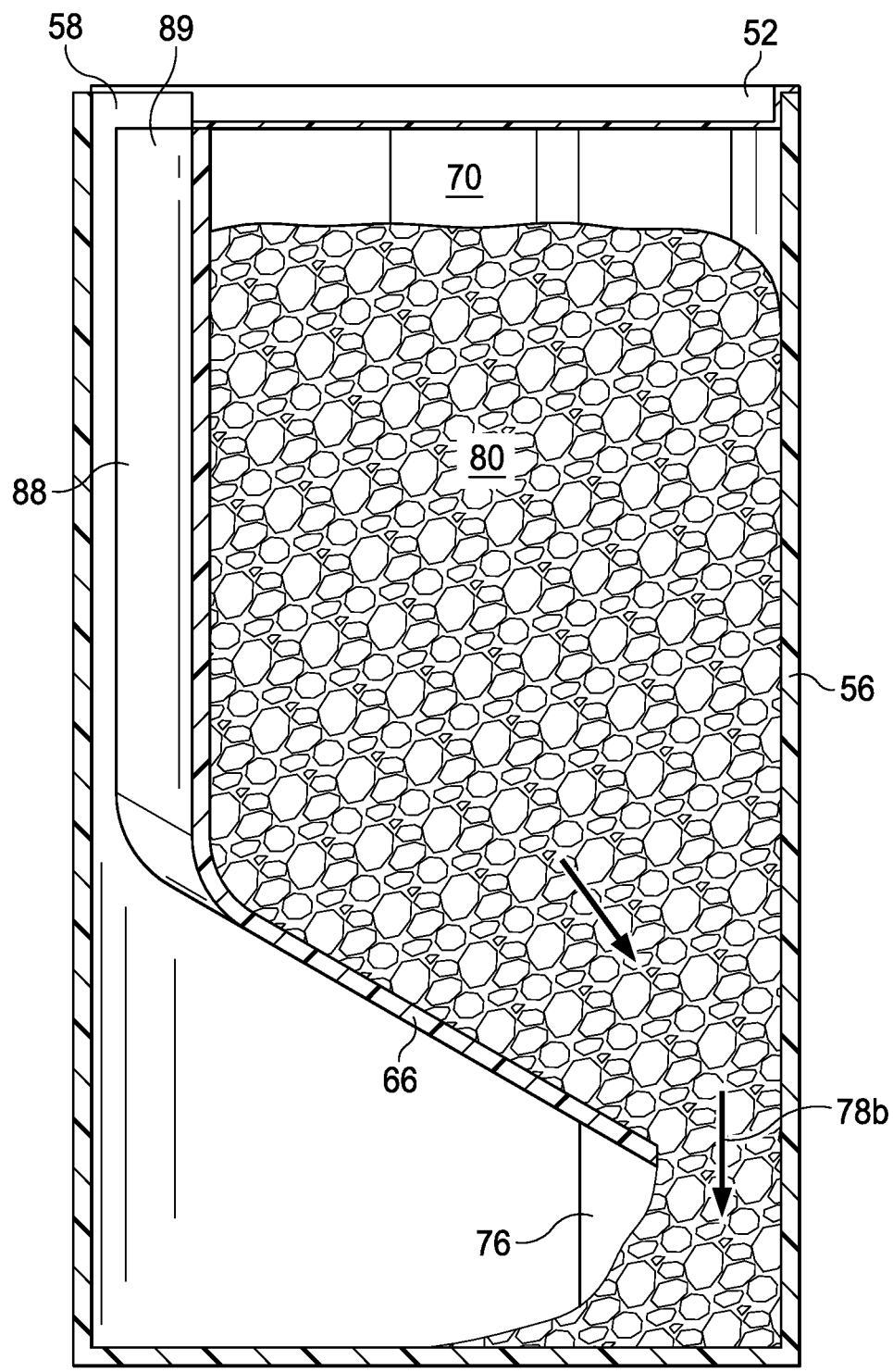
FIG. 18B depicts a cross sectional view of one embodiment of the dispenser with dry product therein.

FIGS. 18B-D illustrate one embodiment of the dispenser described herein, comprising dry product 80 therein. As with FIG. 18A, these figures depict cross sectional views of a dispenser with an internal partition therein and only two compartments as formed by a first elongated portion 68 and a second elongated portion 70. Similar to the dispensing depicted above in FIG. 6, product will flow under the influence of gravity through an exit port 58 of the cap 52. In its upright position shown in FIG. 18B, dry product 80 has flown down through that portion of the dispenser adjacent to the bottom edge of the inclined portion opening between the inner walls of the container and the bottom edge 74 of the internal partition (labeled by the arrow 78b). As previously described, the amount that flows through below the inclined portion will depend upon the length of the supporting member 76. While difficult to see based on the cross sectional view, dry product 82 directly behind the second elongated portion 70 also flows down beneath the inclined portion. In FIG. 18C, flipping the dispenser from its upright position causes the two dry products 80, 82 to begin flowing into and chute 88 formed by the first elongated portion 68. FIG. 18D then depicts the flow of dry products through the discharge port 89, at the end of the chute 88, and thus through the exit port 58 of the cap. As with the dispensing described above in FIG. 6, the exit port 58 is in direct communication with the discharge port 89, or end of the chute 88. In one embodiment, the dispenser is turned from its upright standing position by an angle of at least 45 degrees for proper dispensing. Other embodiments that flip the dispenser greater than 45 degrees will allow for faster exit of dry product from the dispenser. During dispensing, only a very small amount of product (less than 1%) may re-enter the product storage area 24. Thus, the dispenser provides for consistent amount of dry product to be dispensed at any given time so long as the dispenser is flipped so that product flows down through the recessed wall 74 and into the common area 86 beneath the second surface of the inclined portion.

Figure 19:
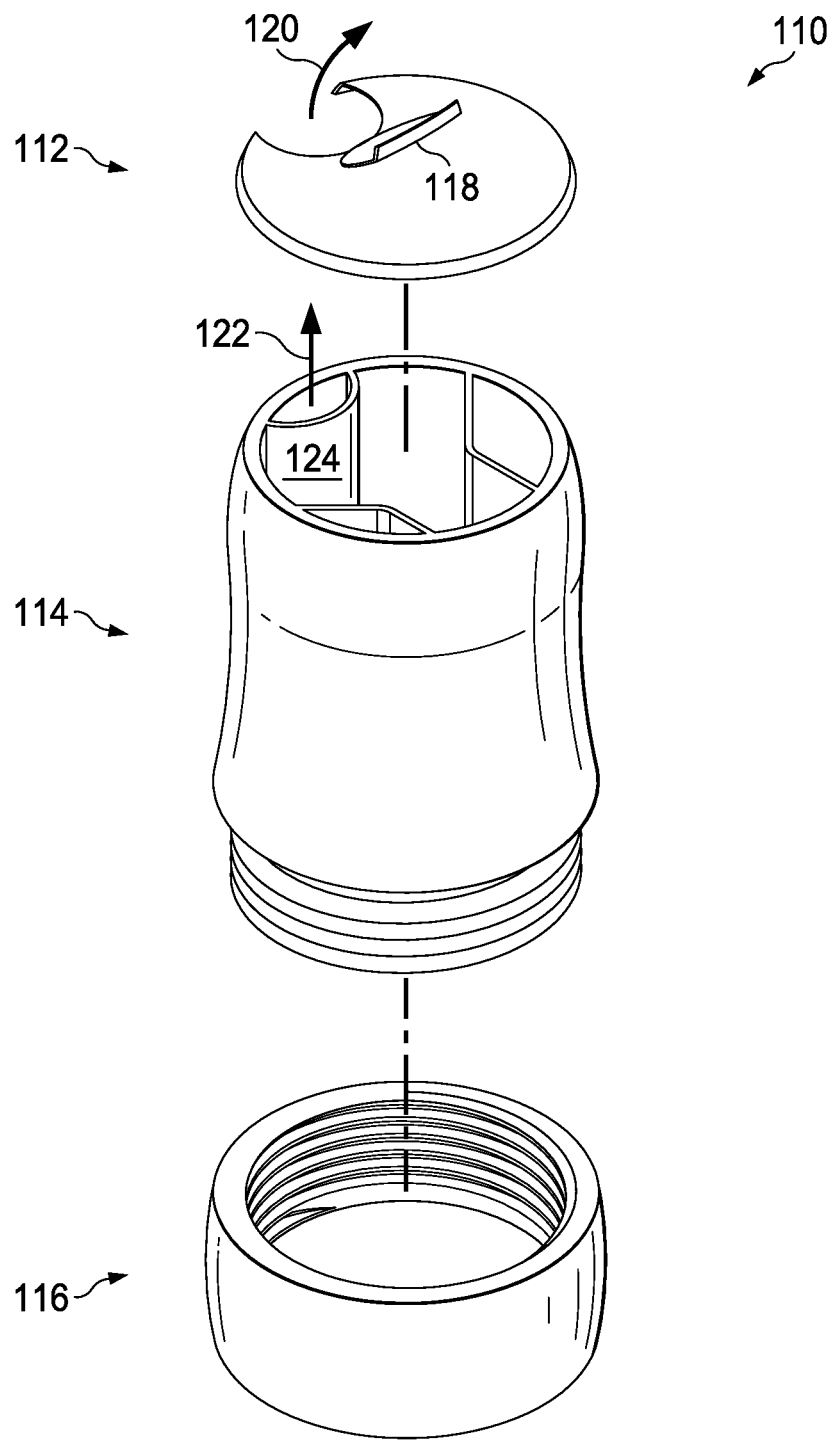
FIG. 19 is an exploded view of one embodiment of the dispenser.

FIG. 19 depicts an exploded view of another embodiment of a dispenser with multiple storage compartments. Similar to the embodiments described in FIGS. 11-18, a dispenser may comprise a cap 112 with a removable or flip top lid 118 exposing an exit port 120 and a body 114 having an internal partition therein, substantially as shown in FIGS. 12A and 12B. However, in this embodiment, the internal partition is shown to be integral to the interior of the body's cavity and therefore no supporting member is necessary to dictate the volume or amount of dry product to be dispensed. Instead, dictating the volume for dispensing is an adjustable volume compartment 116 for adjusting a volume of the cavity and more specifically, of the product dispensing area.

The cap 112 may be substantially identical to the caps of the dispenser embodiments described above and should cover at least a portion of an end of the body 114. Therefore, the description above regarding a cap portion is herein applicable. In one embodiment, as shown in FIG. 19, the cap 112 substantially covers the top end of the body 114 with an opening or exit port 120 through which product may ultimately exit from the dispenser, as further described below. In one embodiment, the cap 112 entirely covers the periphery of the top end opening of the body 114, with an exit port 120 formed in the cap for dispensing of dry products. In one embodiment, the exit port 120 is along one edge of the cap 112 as depicted; however so long as the exit port is in communication with a product dispensing discharging port 122 of a chute similar to that described with reference to reference number 88, above, the dispenser can effectively function as intended. In some embodiments, the exit port 120 may comprise a smaller size or opening without interrupting the rim of the cap 112, with the cap therefore having defined edges or a rim all around it and a hole forming the exit port. The shape of the exit port 120 may comprise any number of shapes so long as it remains in communication with the product dispensing discharge port 122 of the chute formed by the first elongated portion 124. The exposure of an exit port 120 aligned or in communication with the discharge port 122 of the chute may be incorporated into the cap by any means known in the art. The exit port 120 may be formed by a detachable portion, which may be either partially or fully removed to expose the exit port 120, as described above, or it may comprise a flip top cap 118 as shown in FIG. 19.

The cap 112 may be removable or permanent or integral to the top end, so long as it remains in place and covers the product storage areas during dispensing while allowing for the dry products to exit through an opening at the top end. In one embodiment, the cap 112 is removable to ensure easy access to and selectively expose the product storage areas within the body 114 for product receiving and storage or dispenser cleaning.

As described above, in another embodiment, the cap 112 is permanently fixed on one end to create a one-time only use disposable dispenser if desired. Embodiments having a permanently fixed cap integral to the entire first end of the body necessitate an exit port, access to, or formation of an exit port in the cap for dispensing of the dry product.

The cap may serve in part to seal in the dry products within the body when the dispenser is not in use. For sealing dry products within the body, the cap may cover all product storage areas formed by the insert or internal partition described above, or it may cover the entire top end of the body 114. However, in embodiments where the cap 112 completely covers the entire top end of the body, the cap 112 must be either removable or it must comprise a removable portion or opening 120 at a part of the cap in communication with a discharge port 122. The product storage areas must remain capped or closed at the end near the cap during dispensing, whether through use of a separate seal, lid or cap, whether permanently or temporarily in place. When the dispenser is assembled, and prior to use by a consumer, the cap may comprise a tamper-proof type seal, similar to that shown in FIG. 3*a*, which covers the entire top end of the body 114.

The cap 112 may comprise a circumferential rim or flange that engages, locks or seals against the top end of the body 114. As shown in FIG. 11, in one embodiment, the bottom of the cap may comprise a circumferential lip around its perimeter, which engages with a rim or top end of the body 114. This ensures a secure fit around top end of the body that is maintained during dispensing processes. Any secure or tight connection between the cap 112 and the body 114 is acceptable so long as the cap remains in place during dispensing; for example, threading or other snap fit connections. In one embodiment, the cap 112 is substantially flat. In one embodiment, the cap 112 comprises flat external side and a flat internal side. Any cap shape that forms a seal with at least some portion of one end of the body 112 is possible. In some embodiments, the cap will engage with top or uppermost ends of the elongated portions as described above to seal dry product within different compartments formed by the elongated portions of the internal partition.

The body 114 of the dispenser 110, depicted in FIGS. 19-24, comprises an internal partition as described above, without any necessary supporting member below the inclined portion. The body 114 may be similar to the body 10, 56 or the container 42 as described above. In one embodiment, the body 56 comprises a cylindrical shape. However, it should be noted that the body may comprise any number of shapes, including without limitation box, square, cube, triangular, ovular, or irregular shapes having one or more different shapes, so long as the other limitations are met to provide for flow of the dry products from the storage areas and into the product dispensing area as described herein.

Figure 20:
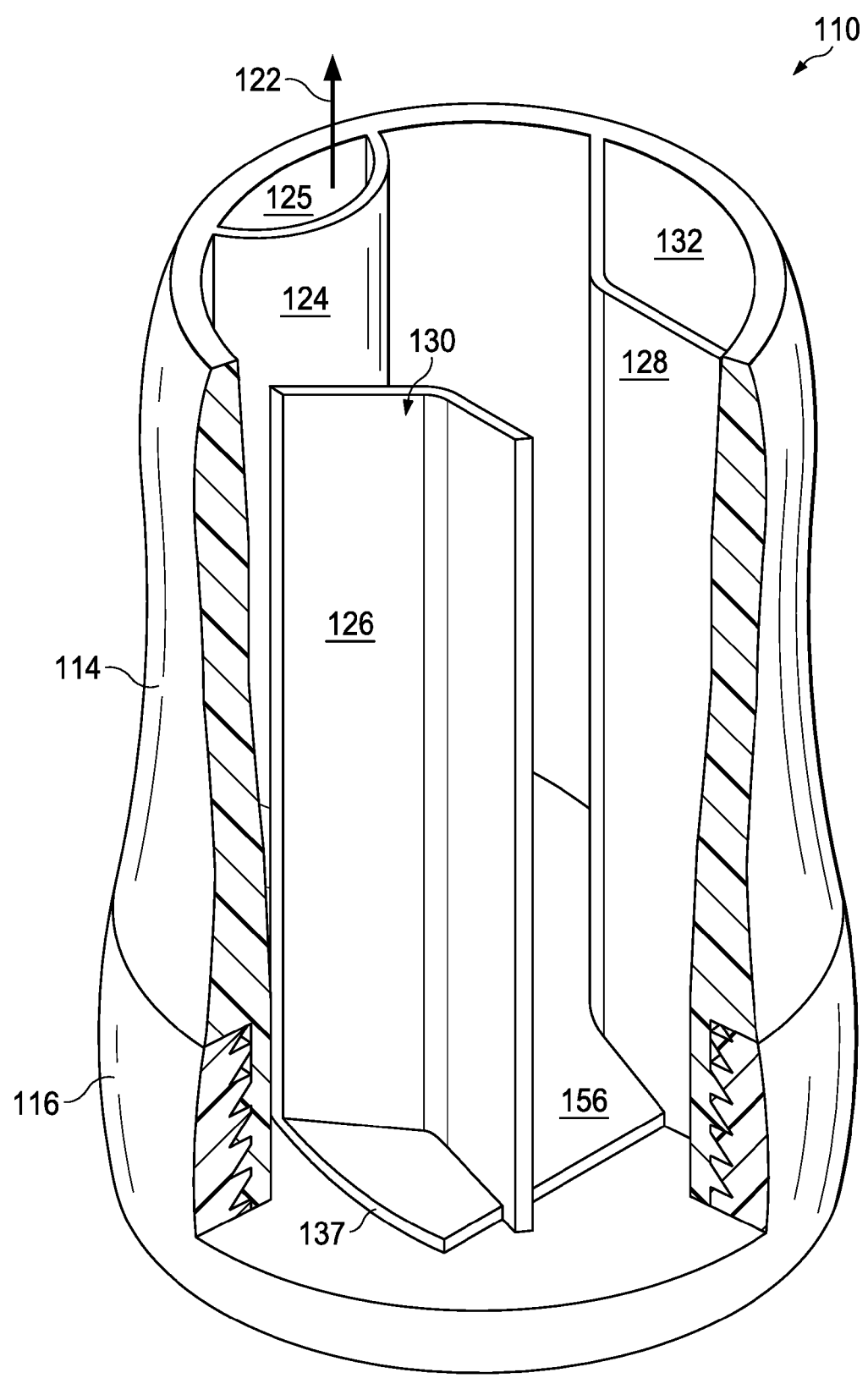
FIG. 20 is a perspective view of an assembled dispenser with cap off in one embodiment.
Figure 21:
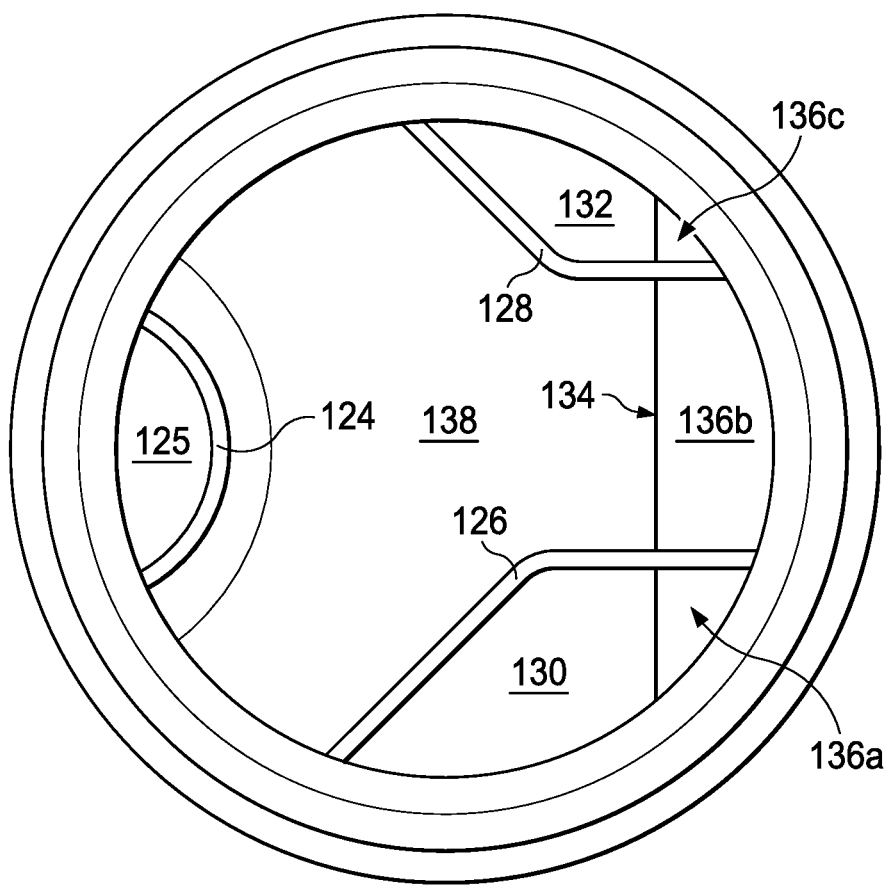
FIG. 21 is a top view of the assembled dispenser of FIG. 20.

Returning to the dispenser depicted in FIGS. 19-21, a dry product dosage dispenser 110 comprises or consists of a body 114 having a top end and a bottom end and a cavity surrounded by inner walls there between; a cap 112 on at least a portion of the top end of the body 114; and an internal partition 156 extending between the top end and the bottom end of the body 114, said internal partition 156 comprising: a first elongated portion 124 having a first side opposite a second side, a first end opposite a second end, and edges that meet with the inner walls of the body to form a product-dispensing chute in the cavity; an inclined portion 138 extending down from the second end of the first elongated portion and comprising a first surface that is an extension of the first side of the first elongated portion and an opposing second surface that is an extension of the second side, said inclined portion sloping away from the chute, wherein said inclined portion comprises a surrounding perimeter that meets with the inner walls except at a perimeter bottom edge 134; and a second elongated portion 126 having a top end opposite a base end, the base end extending from the first surface of the inclined portion, wherein at least a part of the base end extends beyond the perimeter bottom edge 134 and wherein the internal partition 156 divides the cavity into a first product storage area 130, a second product storage area 138, and a product dispensing area 146.

As discussed above, the internal partition 156 is substantially similar to the internal partition 54 described above. Thus, the first elongated portion 124 and the second elongated portion 126 are identical to the first elongated portion 68 and the second elongated portion 70, as described in detail above. Moreover, the first elongated portions 68 and 124 are similar to the elongated portion 30 described above with reference to FIG. 7A. The first elongated portions 68, 124 each run substantially vertically or vertically lengthwise and, when inserted into a body or when an integral part of a body, along one side or portion of the inner walls of the body, making contact therewith. When inside the body, the second end of the elongated portion 68, 124 deviates from contact with the walls; more specifically, the interior side or trough-like portion of the first elongated portion 68, 124 curves away from the walls as it slopes and becomes the opposing second surface of the inclined portion 66, 137. In one embodiment, the first elongated portion 68, 124 is semi-tubular and has an interior arc side, which becomes the opposing second surface of the inclined portion 66, 137. Again, the size or depth of the first elongated portion 68, 124 may vary according to the dry products to be dispensed. By way of example, in one embodiment, the interior arc side of a semi-tubular portion 68, 124 may comprise a depth/arc of between about 0.75 to about 1.75 inches. (please confirm) In one embodiment, the transition between the first elongated portion 68, 124 and the inclined portion 66, 137 is a seamless junction that provides a smooth surface for easy conveyance of the dry product to the exit port.

As apparent by the dispensers 50 and 110, the bottom end of the dispenser may comprise or consist of either a closed end integral to the body (as in FIG. 13 or 18) or an adjustable volume compartment 116 for adjusting a volume of the cavity (as in FIG. 20). When the bottom end comprises a closed end integral to the body, the internal partition comprises a supporting member 76 extending down form the second or bottom surface of the inclined portion 66 (as in FIG. 13 or 18).

Similar to the embodiments depicted above in FIGS. 11-19, the dry product dosage dispenser 110 may comprise a third elongated portion 128 having a bottommost end extending from the first surface of the inclined portion 137, said third elongated portion 128 having a part of its bottommost end extending beyond the perimeter bottom edge 134, said portion further providing the cavity with a third product storage area 132. The perimeter bottom edge 134 is recessed away from the inner walls forming a substantially straight edge, said perimeter bottom edge 134 allowing for dispensing of a first dry product from the first product storage area and a second dry product from the second product storage area to a common area directly beneath the second surface of the inclined portion, said common area in direct communication with the product dispensing area formed in part by the first elongated portion.

The adjustable volume compartment 116 is substantially similar to the adjustable volume compartment 16 depicted in FIGS. 1-6, above. With reference to FIG. 19, the adjustable volume compartment 116 comprises a top end for mating with the bottom or second end of the body 114. In one embodiment, the top end of the adjustable volume compartment 116 may comprise a circumferential opening where the bottom end of the body 114 comprises a corresponding end capable of engaging with the adjustable volume compartment 116. In one embodiment, the adjustable volume compartment 116 comprises threading 140 for mating with the corresponding threading at or near the second end of the body 114 for adjustment by way of a screw interface. However, any means of attachment that allows for vertical displacement may be used. In one embodiment, the body 114 comprises an exterior male threaded interface, while the adjustable volume compartment 116 comprises an internal female threaded interface. In principle, both the cap 112 and the adjustable volume compartment 116 on opposing ends of the body 114 can be releasably connected to the body by any state-of-the-art connection.

Figure 22:
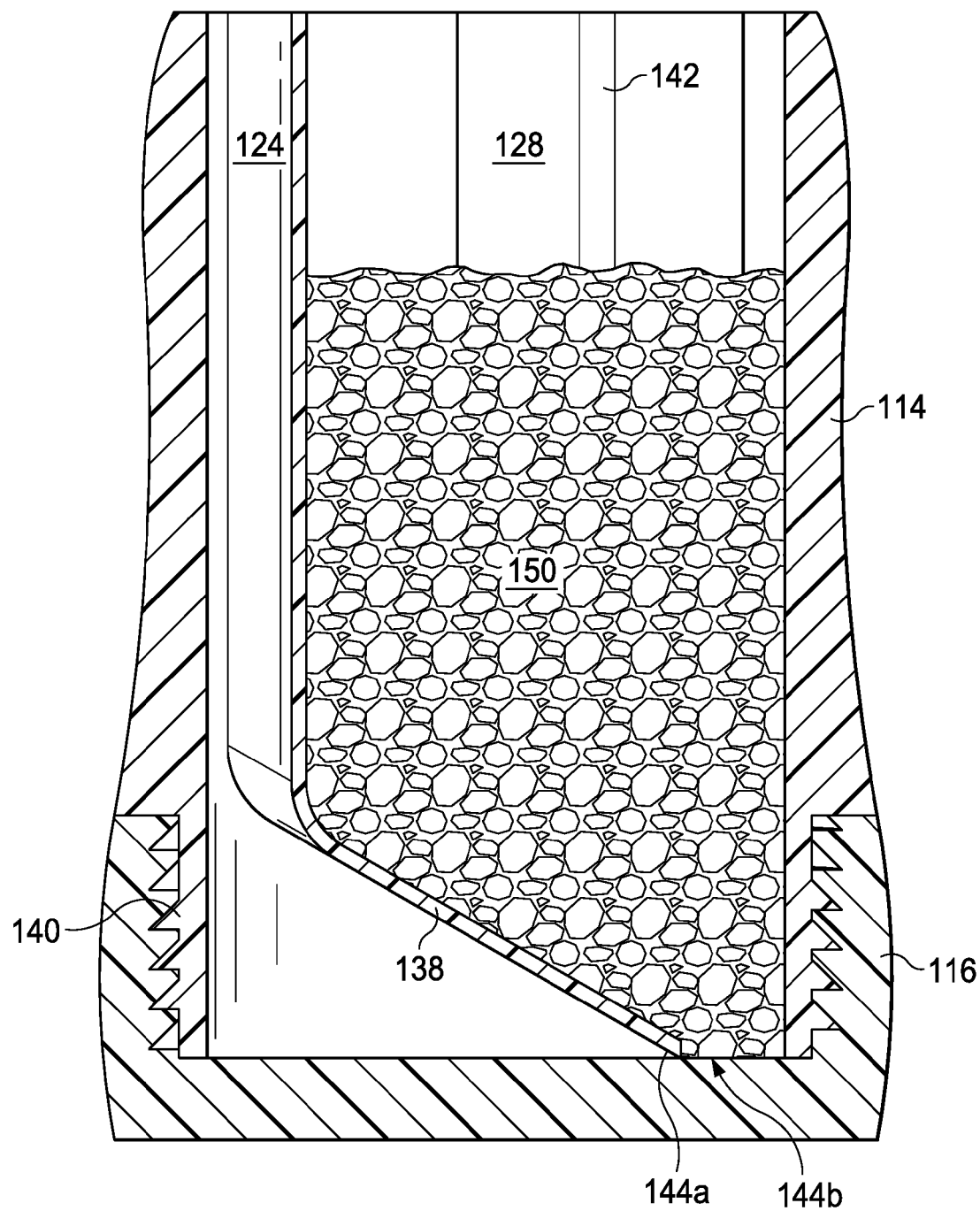
FIG. 22 is a cross sectional view of one embodiment of the dispenser, having dry product therein, in a closed position without the cap.

As perhaps best shown in FIG. 22, the adjustable volume compartment 116 contacts the second surface of the inclined portion at 144a when the apparatus is in a closed position and the cap covers the larger top opening, thereby sealing at least a first dry product within the first product storage area and a second dry product within a second product storage area. When the optional third elongated portion is present, the cap further covers and seals in a third dry product within a third product storage area. Returning to FIG. 22, in the closed position, dry product 150 rests on the interior bottom of the adjustable volume compartment 116 within the opening 144b between the recessed portion created by the perimeter bottom edge 134 and the inner walls of the body 114. While the opening 144b is shown in FIG. 22 as one opening for one dry product 150, it should be noted that additional dry product can be stored for dispensing within the dispenser through use of a second elongated portion 128 and/or optional third elongated portion.

Figure 23A:
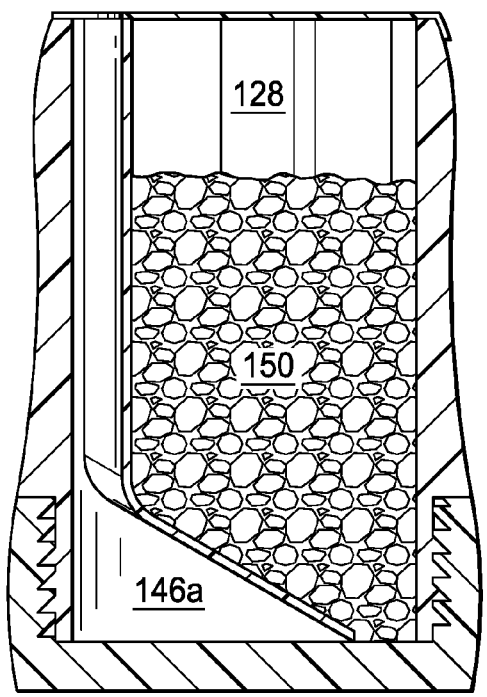
FIG. 23A is a cross-sectional view of one embodiment of the dispenser when substantially closed having dry product therein.
Figure 23B:
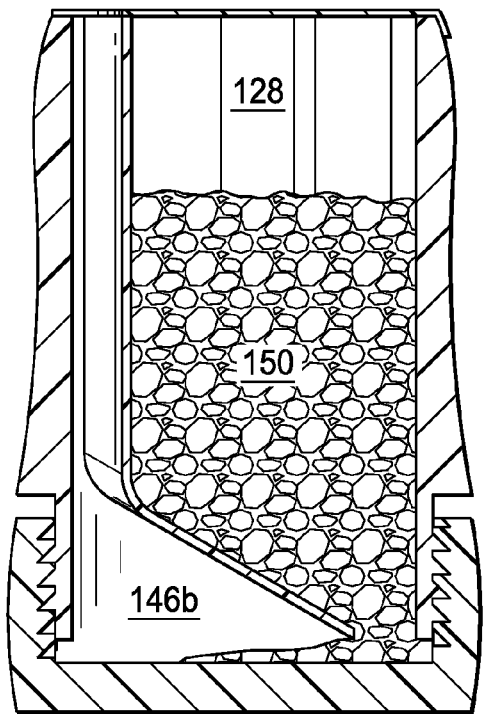
FIG. 23B is a cross-sectional view of one embodiment of the dispenser when adjusted to receive a measured quantity of dry food from the product storage area.
Figure 23C:
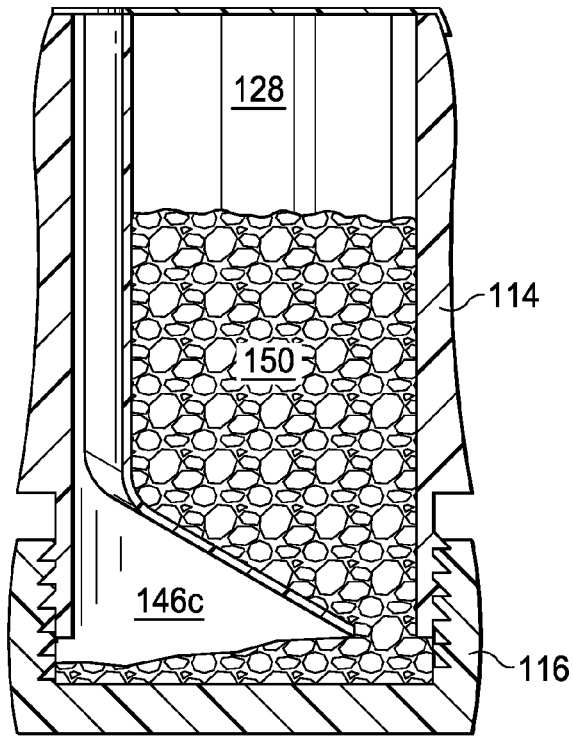
FIG. 23C is a cross-sectional view of one embodiment of the dispenser when further adjusted to receive a measured quantity of dry food from the product storage area.

With reference to FIGS. 23A-C, the adjustable volume compartment 116 may be vertically adjusted or displaced to enlarge or vary the common area of space 146 below the inclined portion of the internal partition. In FIG. 23A, the dispenser is shown in closed position having dry product 150 sealed therein. While not depicted in this cross-sectional view, another dry product may also be sealed therein opposite the second elongated portion 128. The common area of space 146a, which is beneath the inclined portion and forms part of the product dispensing area, is substantially or entirely empty when the dispenser is in the closed position as in FIG. 23A. As the adjustable volume compartment 116 is adjusted down away from the body 114, as shown in FIG. 23B, an enlarged common area of space 146b is created and any dry product stored within the dispenser begins to flow out into the area beneath the internal partition. FIG. 23C shows additional dry product flowing into an enlarged common area of space 146c when additional dry product amounts are desired. Thus, the area where product flows beneath the internal partition for dispensing is a variable common area of space 146, which can be adjusted depending on the desired amount of dispensing. Thus, the product dispensing area, made up of the common area of space and the adjacent chute, is a variable product dispensing area.

Depending as the adjustable volume compartment 116 is vertically displaced away from the body 114, the volume of the cavity within the body is also enlarged. Controlling the adjustable volume compartment directly effects how much product is dispensed. Generally, the further the adjustable volume compartment is displaced away from the body 114, the greater the volume of the common area 146 and the greater the amount of product dispensed. Conversely, a smaller common area 126 provides for a smaller dose of dry product. Either the body 114 or the adjustable volume compartment 116 may comprise, on its exterior, marked measurements for consumer reference in some embodiments. The dispenser may further optionally comprise a product level window or similar indicator to show how much product has been dispensed or remains.

Figure 24B:
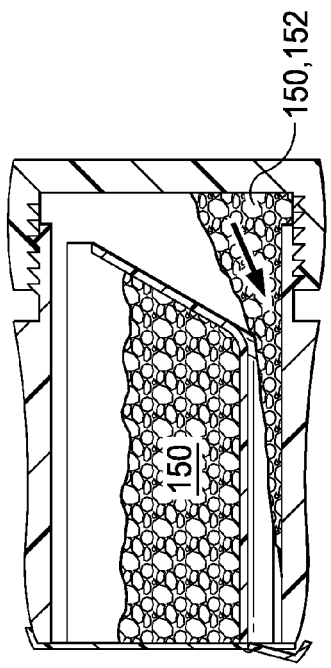
FIG. 24B depicts the dry product flow along the length of the product-dispensing area during dispensing.
Figure 24C:
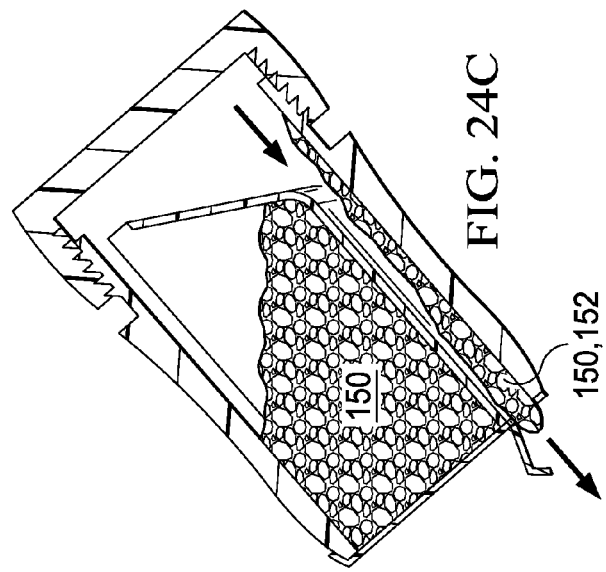
FIG. 24C depicts the dry product flow through the exit port of the dispenser.
Figure 24A:
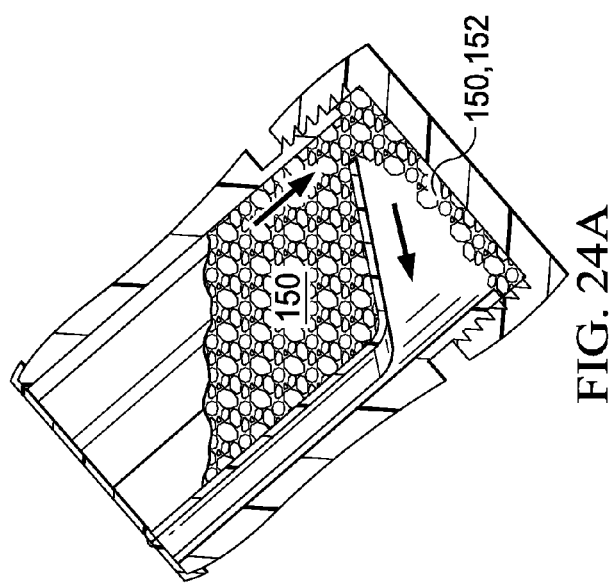
FIG. 24A depicts the dry product flow after adjustment of the volume compartment during dispensing.

Once the desired amount is established, the dry product(s) therein may be dispensed as shown in FIGS. 24A-C. Dry product(s) 150, 152, in one embodiment, may flow down and into the common area beneath the inclined portion. As the dispenser is flipped from its upright position, the dry product(s) 150, 152 flow into and through the chute (FIG. 24B) and then out through a discharge port and exit port in the cap (FIG. 24C).

Another aspect of the present disclosure relates to a method of forming a dry product dosage dispenser for more than one dry product. The method comprises the steps of: providing a container with a body having a top end and a bottom end with a cavity there between; forming at least three sub-cavities within the cavity with an internal partition that extends from the first top to the bottom end, wherein the internal partition comprises an inclined portion having a perimeter in direct contact with an internal perimeter of the body except along an edge furthest away from the top end, and wherein the at least three sub-cavities comprise a first product storage area, a second product storage area, and a product dispensing area; capping at least a portion of the first end of the container; wherein the bottom end comprises a bottom piece selected from one of an integral closed end or an adjustable volume compartment movably connected to the bottom end of the body.

As described above through reference to a cap portion, the capping step comprises covering the product storage areas. More specifically, the capping step comprises covering the first end of the body with a cap. In one embodiment, the cap comprises a detachable portion, said detachable portion removable to expose an exit port for the dry product, wherein said exit port is in communication with a discharge port of the product dispensing area. In one embodiment, the cap comprising an opening that exposes the exit port. The cap may be removable or integral to form a single piece with the body.

The internal partition, as described above in detail, comprises a supporting member, when the bottom end comprises the integral closed end. In such embodiments, the bottom of the supporting member contacts the integral closed end on its interior side. This sets the amount of volume in which dry products will flow for ultimate dispensing.

In embodiments comprising the adjustable volume compartment, as described above in detail, the adjustable volume compartment is vertically adjustable to create an enlarged volume of space within the cavity, wherein said enlarged volume of space creates an open communication for dry product flow through a portion of the top end of the body. More specifically, vertical displacement of the adjustable volume compartment down and away from the body produces an enlarged common area of space for the dry products to flow before passing into the adjacent chute in communication therewith. The chute ends at the top of the dispenser in a discharge port, through which the dry product passes before reaching the exit port of the cap.

While the above description utilizes the terms top, bottom, above, and below, these terms are used only for purposes of orientation and relate to the position or orientation depicted in the accompanying figures. It should be understood that these terms have reference only to the structures shown in the drawings as it would appear to a person viewing the drawings and are utilized only to facilitate describing the invention.

While this invention has been particularly shown and described with reference to certain embodiments, it will be understood by those skilled in the art that various changes in form and detail may be made therein without departing from the spirit and scope of the invention. The inventor expects skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

ADDITIONAL DESCRIPTION

The following clauses are offered as further description of the disclosed invention.

1. A partition for transforming a canister with inner walls into a dry product dosage dispenser having more than two compartments, the partition comprising:
  a first elongated portion having a first side opposite a second side, and a first end opposite a second end, said first elongated portion forming a channel for conveying dry product along its second side;
  an inclined portion extending down from the second end of the first elongated portion and comprising a first surface that is an extension of the first side of the first elongated portion and an opposing second surface that is an extension of the second side, said inclined portion sloping down from the first elongated portion to a bottom edge of the inclined portion; and
  a second elongated portion having a top end and a base end, the base end extending from the first surface of the inclined portion and wherein the second elongated portion forms a first compartment for storage within its exterior surface and a second compartment for storage outside of the first compartment.

2. The partition of clause 1 comprising a third elongated portion having a bottommost end extending from the first surface of the inclined portion outside of the first compartment, wherein part of the third elongated portion extends beyond the bottom edge of the inclined portion and wherein the third elongated portion forms a third compartment for storage within its exterior surface.

3. The partition of clause 1 comprising a supporting member extending down from the second surface of the inclined portion.

4. The partition of clause 1 wherein the first surface of the inclined portion and its opposing second surface are substantially parallel.

5. The partition of clause 1 wherein the first and the second elongated portions are substantially vertical.

6. The partition of clause 2 wherein the first, second, and third elongated portions are substantially vertical.

7. The partition of clause 1 wherein the inclined portion is symmetrical about the first elongated portion.

8. The partition of clause 1 wherein the inclined portion comprises a surrounding perimeter of a shape to directly contact the inner walls of the canister except along the bottom edge of the inclined portion.

9. The partition of clause 1 wherein the bottom edge of the inclined portion is substantially straight.

10. The partition of clause 1 wherein the first side of the first elongated portion is convex and the second side of the first elongated portion is concave.

11. The partition of clause 2 wherein the first, second and third elongated portions each comprise a shape with a vertex pointing away from a surrounding perimeter of the inclined portion.

12. The partition of clause 1 wherein the second elongated portion comprises a first vertical side edge extending from its top end to its base end at the first surface of the inclined portion and a second vertical side edge extending its top end to its base end, optionally below the second surface of the inclined portion.

13. The partition of clause 2 wherein the third elongated portion comprises a first vertical side edge extending from the its top end to its base end at the first surface of the inclined portion and a second vertical side edge extending from its top end to its base end, and optionally below the second surface of the inclined portion.

14. A dry product dosage dispenser, said dispenser comprising:
a body having a top end and a bottom end and a cavity surrounded by inner walls there between;
a cap on at least a portion of the top end of the body; and
an internal partition extending between the top end and the bottom end of the body, said internal partition comprising:
a first elongated portion having a first side opposite a second side, a first end opposite a second end, and edges that meet with the inner walls of the body to form a product-dispensing chute in the cavity;
an inclined portion extending down from the second end of the first elongated portion and comprising a first surface that is an extension of the first side of the first elongated portion and an opposing second surface that is an extension of the second side, said inclined portion sloping away from the chute, wherein said inclined portion comprises a surrounding perimeter that meets with the inner walls except at a perimeter bottom edge; and
a second elongated portion having a top end opposite a base end, the base end extending from the first surface of the inclined portion, wherein at least a part of the base end extends beyond the perimeter bottom edge;
wherein the internal partition divides the cavity into a first product storage area, a second product storage area, and a product dispensing area.

15. The dry product dosage dispenser of clause 14 wherein the bottom end comprises one of a closed end integral to the body or an adjustable volume compartment for adjusting a volume of the cavity.

16. The dry product dosage dispenser of clause 15 wherein the internal partition comprises a supporting member extending down from the second surface of the inclined portion when the bottom end comprises the closed end.

17. The dry product dosage dispenser of clause 14 wherein the internal partition comprises a third elongated portion having a bottommost end extending from the first surface of the inclined portion, said third elongated portion having a part of its bottommost end extending beyond the perimeter bottom edge, said portion further providing the cavity with a third product storage area.

18. The dry product dosage dispenser of clause 14 wherein the first side of the first elongated portion is convex and the second side of the first elongated portion is concave.

19. The dry product dosage dispenser of clause 14 wherein the perimeter bottom edge is recessed away from the inner walls forming a substantially straight edge, said perimeter bottom edge allowing for dispensing of a first dry product from the first product storage area and a second dry product from the second product storage area to a common area directly beneath the second surface of the inclined portion, said common area in direct communication with the product dispensing area formed in part by the first elongated portion.

20. The dry product dosage dispenser of clause 15 wherein the adjustable volume compartment contacts the second surface of the inclined portion when the apparatus is in a closed position and the cap covers the larger top opening, thereby sealing a first dry product within the first product storage area and a second dry product within a second product storage area.

21. The dry product dosage dispenser of clause 14 wherein the cap comprises an exit port for a first dry product from the first product storage and a second dry product from the second product storage area, said exit port in direct communication with the chute.

22. The dry product dosage dispenser of clause 15 wherein the adjustable volume compartment comprises a rim extending about its periphery, said rim for mating with the bottom end of the body.

23. The dry product dosage dispenser of clause 22 wherein the rim comprises threading for mating with corresponding threading near the bottom end of the body.

24. The dry product dosage dispenser of clause 15 wherein the adjustable volume compartment is vertically adjustable to create a variable common area of space within the cavity, said variable common area of space creating an open communication for the flow of at least a first and second dry product through the product-dispensing chute.

25. The dry product dosage dispenser of clause 14 wherein the internal partition is an integral part of the body.

26. A method of forming a dry product dosage dispenser for more than one dry product, said method comprising the steps of:
providing a container with a body having a top end and a bottom end with a cavity there between;
forming at least three sub-cavities within the cavity with an internal partition that extends from the first top to the bottom end, wherein the internal partition comprises an inclined portion having a perimeter in direct contact with an internal perimeter of the body except along an edge furthest away from the top end, and wherein the at least three sub-cavities comprise a first product storage area, a second product storage area, and a product dispensing area;
capping at least a portion of the first end of the container;
wherein the bottom end comprises a bottom piece selected from one of an integral closed end or an adjustable volume compartment movably connected to the bottom end of the body.

27. The method of clause 26 wherein the capping step comprises covering the product storage areas.

28. The method of clause 26 wherein the capping step comprises covering the first end of the body with a cap comprising a detachable portion, said detachable portion removable to expose an exit port for the dry product, wherein said exit port is in communication with a discharge port of the product dispensing area.

29. The method of clause 26 wherein the internal partition comprises a supporting member, said supporting member contacting the integral closed end.

30. The method of clause 26 wherein the adjustable volume compartment is vertically adjustable to create an enlarged volume of space within the cavity, wherein said enlarged volume of space creates an open communication for dry product flow through a portion of the top end of the body.

I claim:

1. A partition for transforming a canister with inner walls into a product dosage dispenser having more than two compartments, the partition comprising:
a first elongated portion having a first side opposite a second side, and a first end opposite a second end, said first elongated portion forming a channel for conveying product along the second side to the first end of the first elongated portion;
an inclined portion extending down from the second end of the first elongated portion and comprising a first surface that is an extension of the first side of the first elongated portion and an opposing second surface that is an extension of the second side, said inclined portion sloping down from the first elongated portion to a bottom edge of the inclined portion, wherein the inclined portion comprises a surrounding perimeter of a shape to directly contact at least a portion of the inner walls of the canister; and a second elongated portion having a top end and a base end, the base end extending from the first surface of the inclined portion and wherein the second elongated portion forms a first compartment for storage within an exterior surface and a second compartment for storage outside of the first compartment.

2. The partition of claim 1 comprising a third elongated portion having a bottommost end extending from the first surface of the inclined portion outside of the first compartment, wherein part of the third elongated portion extends beyond the bottom edge of the inclined portion and wherein the third elongated portion forms a third compartment for storage within an exterior surface.

3. The partition of claim 2 wherein the first elongated portion, the second elongated portion, and the third elongated portion are each substantially vertical.

4. The partition of claim 2 wherein the first, second and third elongated portions each comprise a shape with a vertex pointing away from a surrounding perimeter of the inclined portion.

5. The partition of claim 2 wherein the third elongated portion comprises a first vertical side edge extending from the top end to the base end at the first surface of the inclined portion and a second vertical side edge extending from the top end to the base end, and optionally below the second surface of the inclined portion.

6. The partition of claim 1 comprising a supporting member extending down from the second surface of the inclined portion.

7. The partition of claim 1 wherein the first surface of the inclined portion and the opposing second surface are substantially parallel.

8. The partition of claim 1 wherein the first elongated portion is substantially vertical and the second elongated portion is substantially vertical.

9. The partition of claim 1 wherein the inclined portion is symmetrical about the first elongated portion.

10. The partition of claim 1 wherein the the shape of the surrounding perimeter directly contacts the inner walls of the canister except along the bottom edge of the inclined portion.

11. The partition of claim 1 wherein the bottom edge of the inclined portion is substantially straight.

12. The partition of claim 1 wherein the first side of the first elongated portion is convex and the second side of the first elongated portion is concave.

13. The partition of claim 1 wherein the second elongated portion comprises a first vertical side edge extending from the top end to the base end at the first surface of the inclined portion and a second vertical side edge extending from the top end to the base end, optionally below the second surface of the inclined portion.

14. A dry product dosage dispenser, said dispenser comprising:

a body having a top end and a bottom end and a cavity surrounded by inner walls there between;

a cap on at least a portion of the top end of the body; and an internal partition extending between the top end and the bottom end of the body, said internal partition comprising:

a first elongated portion having a first side opposite a second side, a first end opposite a second end, and said first elongated portion having edges that meet with the inner walls of the body forming a channel for conveying dry product along the second side, wherein said channel is a product-dispensing chute;

an inclined portion extending down from the second end of the first elongated portion and comprising a first surface that is an extension of the first side of the first elongated portion and an opposing second surface that is an extension of the second side, said inclined portion sloping down from the first elongated portion to a bottom edge of the inclined portion and away from the chute, wherein said inclined portion comprises a surrounding perimeter that meets with the inner walls except at a perimeter bottom edge; and a second elongated portion having a top end opposite a base end, the base end extending from the first surface of the inclined portion, wherein the second elongated portion forms a first compartment for storage within an exterior surface and a second compartment for storage outside of the first compartment and wherein at least a part of the base end extends beyond the perimeter bottom edge;

wherein the internal partition divides the cavity into a first product storage area, a second product storage area, and a product dispensing area.

15. The dry product dosage dispenser of claim 14 wherein the bottom end comprises one of a closed end integral to the body or an adjustable volume compartment for adjusting a volume of the cavity.

16. The dry product dosage dispenser of claim 15 wherein the internal partition comprises a supporting member extending down from the second surface of the inclined portion when the bottom end comprises the closed end.

17. The dry product dosage dispenser of claim 15 wherein the adjustable volume compartment contacts the second surface of the inclined portion when the apparatus is in a closed position and the cap covers the larger top opening, thereby sealing a first dry product within the first product storage area and a second dry product within a second product storage area.

18. The dry product dosage dispenser of claim 15 wherein the adjustable volume compartment comprises a periphery extending about a rim, said rim for mating with the bottom end of the body.

19. The dry product dosage dispenser of claim 18 wherein the rim comprises threading for mating with corresponding threading near the bottom end of the body.

20. The dry product dosage dispenser of claim 15 wherein the adjustable volume compartment is vertically adjustable to create a variable common area of space within the cavity, said variable common area of space creating an open communication for the flow of at least a first and second dry product through the product-dispensing chute.

21. The dry product dosage dispenser of claim 14 wherein the internal partition comprises a third elongated portion having a bottommost end extending from the first surface of the inclined portion, a part of the bottommost end extending beyond the perimeter bottom edge of the inclined portion, said third elongated portion further providing the cavity with a third product storage area.

22. The dry product dosage dispenser of claim 14 wherein the first side of the first elongated portion is convex and the second side of the first elongated portion is concave.

23. The dry product dosage dispenser of claim 14 wherein the perimeter bottom edge is recessed away from the inner walls forming a substantially straight edge, said perimeter bottom edge allowing for dispensing of a first dry product from the first product storage area and a second dry product from the second product storage area to a common area directly beneath the second surface of the inclined portion, said common area in direct communication with the product dispensing area formed in part by the first elongated portion.

24. The dry product dosage dispenser of claim 14 wherein the cap comprises an exit port for a first dry product from the first product storage and a second dry product from the second product storage area, said exit port in direct communication with the chute.

25. The dry product dosage dispenser of claim 14 wherein the internal partition is an integral part of the body.

26. A method of forming a dry product dosage dispenser for more than one dry product, said method comprising the steps of:
    providing a container with a body having a top end and a bottom end with a cavity there between;
    forming at least three sub-cavities within the cavity with an internal partition that extends from the first top to the bottom end, wherein the internal partition comprises an inclined portion having a perimeter in direct contact with an internal perimeter of the body except along an edge furthest away from the top end, and wherein the at least three sub-cavities comprise a first product storage area, a second product storage area, and a product dispensing area;
    capping at least a portion of the first end of the container;
    wherein the bottom end comprises a bottom piece selected from one of an integral closed end or an adjustable volume compartment movably connected to the bottom end of the body.

27. The method of claim 26 wherein the capping step comprises covering the product storage areas.

28. The method of claim 26 wherein the capping step comprises covering the first end of the body with a cap comprising a detachable portion, said detachable portion removable to expose an exit port for the dry product, wherein said exit port is in communication with a discharge port of the product dispensing area.

29. The method of claim 26 wherein the internal partition comprises a supporting member, said supporting member contacting the integral closed end.

30. The method of claim 26 wherein the adjustable volume compartment is vertically adjustable to create an enlarged volume of space within the cavity, wherein said enlarged volume of space creates an open communication for dry product flow through a portion of the top end of the body.

* * * * *